United States Patent
Yi et al.

(10) Patent No.: US 12,061,407 B2
(45) Date of Patent: Aug. 13, 2024

(54) HIGH-EFFICIENCY END-FIRE 3D OPTICAL PHASED ARRAY BASED ON MULTI-LAYER PLATFORM

(71) Applicant: THE REGENTS OF THE UNIVERSITY OF MICHIGAN, Ann Arbor, MI (US)

(72) Inventors: Ya Sha Yi, Troy, MI (US); Da Chuan Wu, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 777 days.

(21) Appl. No.: 17/189,472

(22) Filed: Mar. 2, 2021

(65) Prior Publication Data
US 2021/0271148 A1  Sep. 2, 2021

Related U.S. Application Data

(60) Provisional application No. 62/984,004, filed on Mar. 2, 2020.

(51) Int. Cl.
*G02F 1/29* (2006.01)
*G01S 7/481* (2006.01)
*G02F 1/295* (2006.01)

(52) U.S. Cl.
CPC ............ *G02F 1/292* (2013.01); *G01S 7/4814* (2013.01); *G01S 7/4818* (2013.01); *G02F 1/291* (2021.01);
(Continued)

(58) Field of Classification Search
CPC .............................. G02F 1/292; G02F 1/2955
See application file for complete search history.

(56) References Cited

U.S. PATENT DOCUMENTS 6,563,966 B1   5/2003  Tang
7,231,102 B2 *  6/2007  Ridgway ................ G02F 1/065
                                                    385/9
(Continued)

FOREIGN PATENT DOCUMENTS

KR    20190000188 A    1/2019
WO    2019171806 A1    9/2019

OTHER PUBLICATIONS

Heck, Martijn J.R.. "Highly integrated optical phased arrays: photonic integrated circuits for optical beam shaping and beam steering" Nanophotonics, vol. 6, No. 1, 2017 (available Jun. 25, 2016), pp. 93-107. https://doi.org/10.1515/nanoph-2015-0152 (Year: 2016).*

(Continued)

*Primary Examiner* — Michelle R Connelly
*Assistant Examiner* — Emma R. Oxford
(74) *Attorney, Agent, or Firm* — Harness, Dickey & Pierce, P.L.C.

(57) ABSTRACT

Beam steering device such as optical phased array (OPA) is a key component in applications of solid-state LIDAR and wireless communication. The traditional single-layer OPA results in a significant energy loss due to the substrate leakage caused by the downward coupling from the grating coupler structure. In the present disclosure, we have investigated a structure based on multi-layers $Si_3N_4/SiO_2$ platform that can form a 3D OPA to emit the light from the edge of the device with a high efficiency, a 2D converged outcoupling beam will be end-fired to the air. The high efficiency and wide horizontal beam steering are demonstrated numerically, the influence of vertical crosstalk, the delay length, number of waveguide layers, and the fabrication feasibility are also discussed.

9 Claims, 22 Drawing Sheets

(52) U.S. Cl.
CPC .......... *G02F 1/2955* (2013.01); *G01S 7/4817* (2013.01); *G02F 2201/20* (2013.01); *G02F 2203/24* (2013.01)

(56) References Cited

U.S. PATENT DOCUMENTS

| | | | |
|---|---|---|---|
| 10,365,536 B1* | 7/2019 | Jenkins | G01S 17/02 |
| 11,914,190 B2* | 2/2024 | Muñoz | G02B 6/34 |
| 2006/0088265 A1* | 4/2006 | Akiyama | G02B 6/1223 385/129 |
| 2015/0147027 A1* | 5/2015 | Bolle | G02B 6/2938 385/17 |
| 2015/0346521 A1* | 12/2015 | Williams | G02F 1/035 385/2 |
| 2017/0307736 A1 | 10/2017 | Donovan | |
| 2017/0371227 A1* | 12/2017 | Skirlo | G02F 1/2955 |
| 2018/0039154 A1* | 2/2018 | Hashemi | G02F 1/2955 |
| 2021/0018599 A1* | 1/2021 | Lu | G01S 17/42 |
| 2024/0077671 A1* | 3/2024 | Zhuang | G02B 6/13 |

OTHER PUBLICATIONS

D. Wu, W. Guo, and Y. Yi, "Compound period grating coupler for double beam generation and steering," Appl. Opt. 58, 361-367 (Jan. 4, 2019). (Year: 2019).*

Y. Zhu, S. Zeng, Y. Zhao and L. Zhu, "Hybrid Integration of Multi-Band, Tunable External-Cavity Diode Lasers for Wide-Angle Beam Steering," 2019 Conference on Lasers and Electro-Optics (CLEO), San Jose, CA, USA, May 5-10, 2019, pp. 1-2, doi: 10.1364/ CLEO_SI.2019.SF3N.3. (Year: 2019) (Year: 2019).*

International Search Report and Written Opinion regarding International Application No. PCT/US2021/020453, dated Jun. 24, 2021.

Dachuan Wu et al.,High efficiency end-fire 3-D optical phased array based on multi-layers Si3N4/ SiO2 platform, arXiv:1912.03326v1 [physics.app-ph] Nov. 2019, (https://arxiv.org/abs/1912.03326) pp. 1-3; abstract; and figure 1.

Tin Komljenovic et al., 'Sparse aperiodic arrays for optical beam forming and LIDAR', OSA Publishing, Optics Express, vol. 25, Issue 3, pp. 2511-2528, Feb. 6, 2017, (https://www.osapublishing.org/OE/fulltext.cfm?uri=oe-25-3-2511&id=357835) p. 2513; and abstract.

Hosseini, Amir et al. "On the fabrication of three-dimensional silicon-on-insulator based optical phased array for agile and large angle laser beam steering systems." American Vacuum Society. 2010.

Qin, Chuan et al. "1x256 Multi-layer, low-loss, Si3N4 waveguide optical phased arrays with 0.050° Instantaneous-Field-of-View." Conference Paper—Jan. 2017.

Sun, Jie. "Two-dimensional apodized silicon photonic phased arrays." Optics Letters, vol. 39, No. 2. Jan. 15, 2014.

Kowng, David et al. "1x12 Unequally spaced waveguide array for actively tuned optical phased array on a silicon nanomembrane." Applied Physics Letters. Aug. 2011.

Extended European Search Report regarding Patent Application No. 21763940.0, dated Feb. 7, 2024.

Dachuan Wu et al: "High efficiency end-fire 3-D optical phased array based on multi-layers Si3N4/SiO2 platform", arxiv.org, Cornell University Library, 201 Olin Library Cornell University Ithaca, NY 14853, Nov. 26, 2019 (Nov. 26, 2019), XP081548192.

Tin Komljenovic et al: "Sparse aperiodic arrays for optical beam forming and LIDAR", Optics Express, vol. 25, No. 3, Jan. 31, 2017 (Jan. 31, 2017), p. 2511, XP055475693, Doi: 10.1364/OE.25. 002511.

* cited by examiner

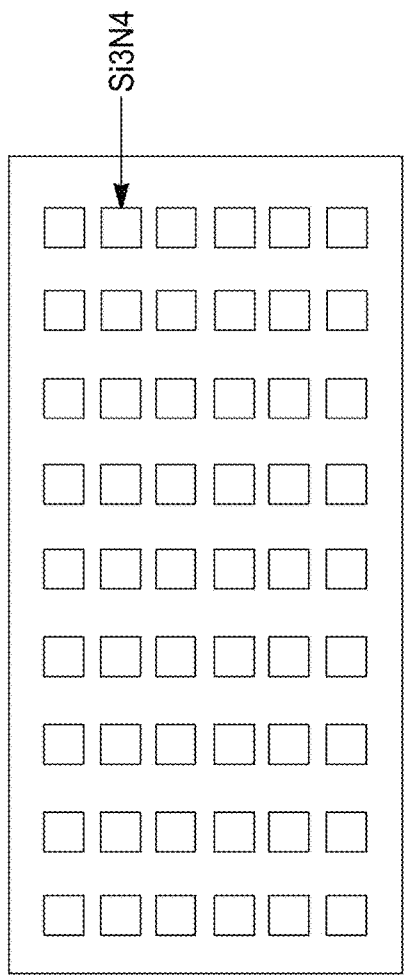
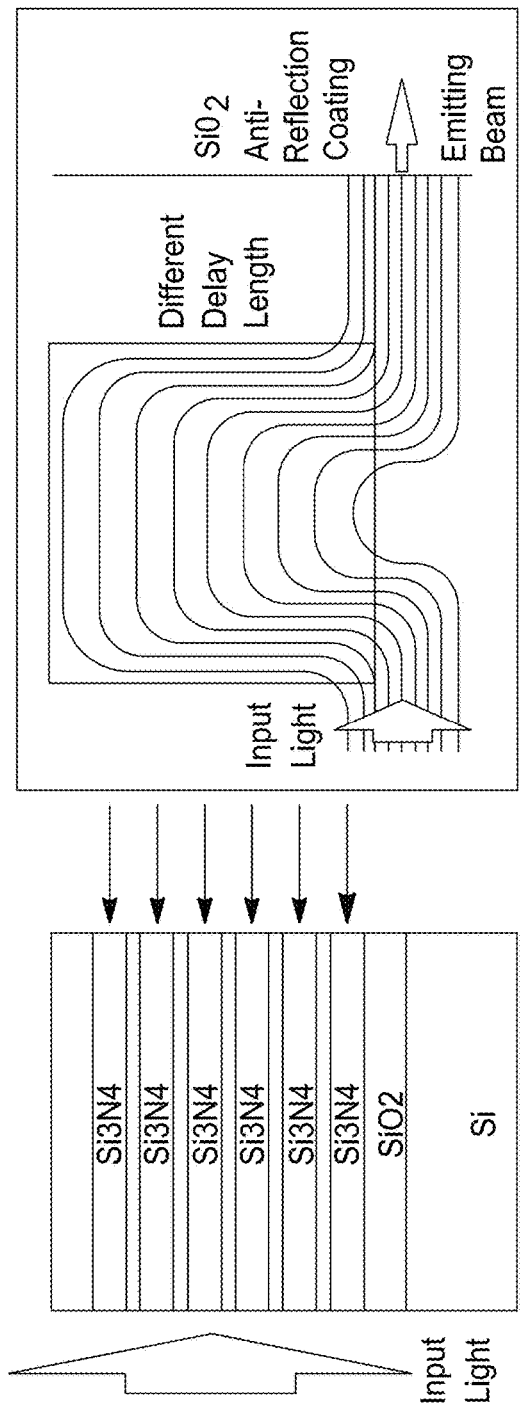

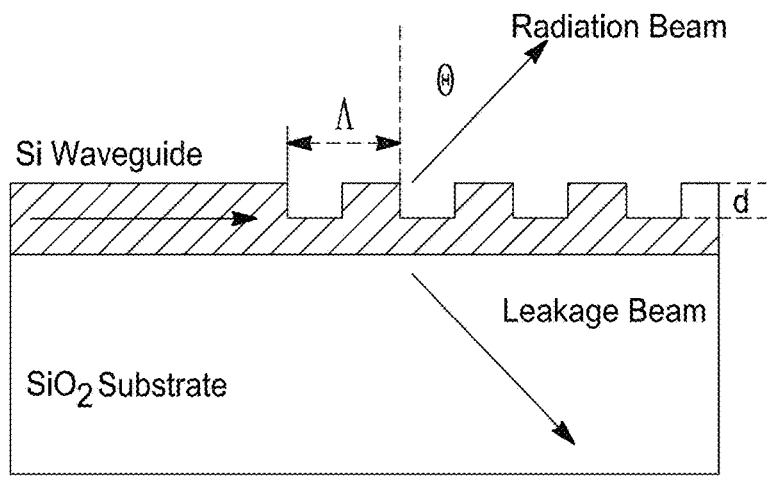
*Fig-16*
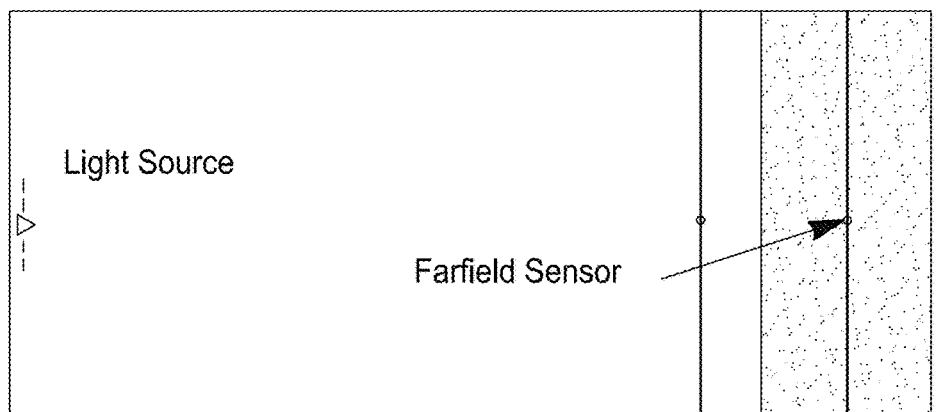
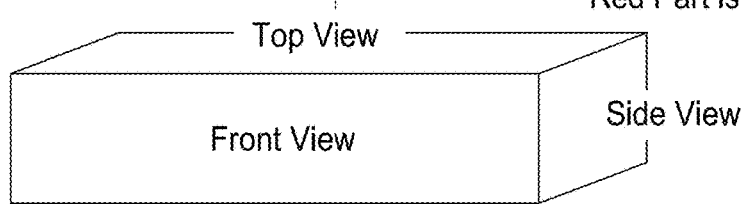
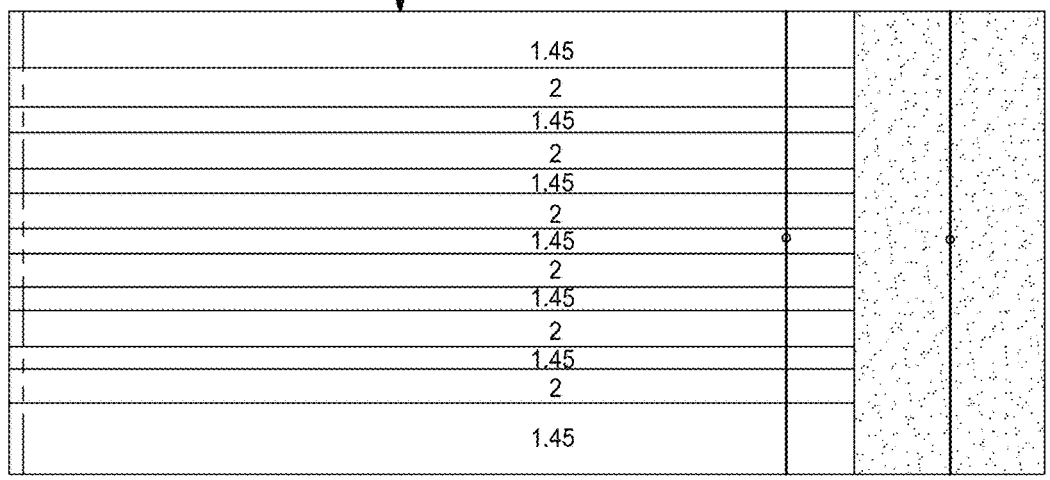
*Fig-17*
The Numbers are the Index of the Layer

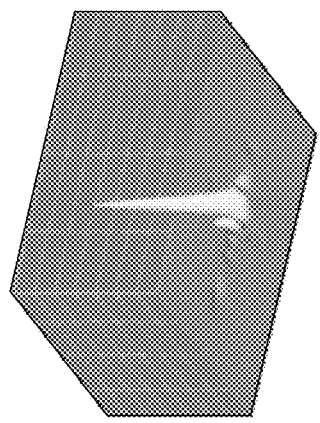
=
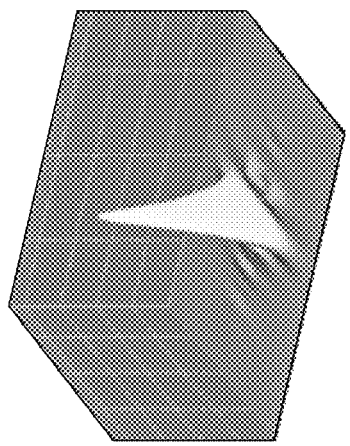
+
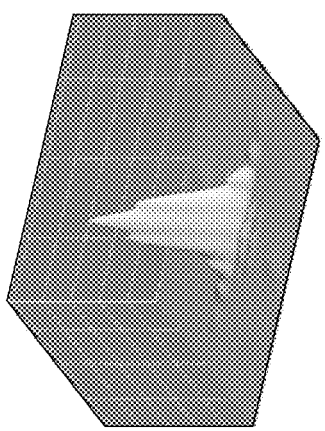
Fig-21

| Wavelength (nm) | Common Periodic Structure | | Quasi-Periodic Structure | |
|---|---|---|---|---|
| | Angle y (degree) | FWHM y (degree) | Angle y (degree) | FWHM y (degree) |
| 1500 | -0.024 | 10.68 | 0.192 | 7.23 |
| 1520 | -0.018 | 11.02 | 0.181 | 7.39 |
| 1540 | -0.013 | 11.22 | 0.180 | 7.51 |
| 1560 | -0.008 | 11.26 | 0.187 | 7.59 |
| 1580 | -0.004 | 11.14 | 0.201 | 7.64 |
| 1600 | -0.002 | 11.03 | 0.216 | 7.69 |

Similar Wavelength Sensitivity    Quasi-Periodic Structure has Lower FWHM

HIGH-EFFICIENCY END-FIRE 3D OPTICAL PHASED ARRAY BASED ON MULTI-LAYER PLATFORM

CROSS-REFERENCE TO RELATED APPLICATIONS

This application claims the benefit of U.S. Provisional Application No. 62/984,004, filed on Mar. 2, 2020. The entire disclosure of the above application is incorporated herein by reference.

GOVERNMENT SUPPORT

This invention was made with government support under ECCS1644731 awarded by the National Science Foundation. The government has certain rights in this invention.

FIELD

The present disclosure relates to a high-efficiency end-fire 3D optical phased array based on multi-layer platform.

BACKGROUND AND SUMMARY

This section provides background information related to the present disclosure which is not necessarily prior art. This section provides a general summary of the disclosure, and is not a comprehensive disclosure of its full scope or all of its features.

With the emerging applications, such as solid-state LIDAR (light detection and ranging), beam steering based on integrated optical phased array (OPA) has drawn many research efforts in the past decade. Significant progress has been made including thermal tuning, electro-optics tuning, high sensitive wavelength tuning, integrated on-chip light source, side lobe suppression by aperiodic, or apodized array placement, etc.

Traditionally, on-chip integrated photonic research usually utilizes a single waveguide layer structure, which is also the case of most studies on OPA. For example, a device structure could be sophisticated due to various requirements yet contain only a single waveguide layer, and because of this, the OPA formed by the single layer can only have an upward beam upward. This typically results in relatively low emitting efficiency. When the OPA is placed in an environment having both its front and backside being made of a uniform medium, the interference of light forms a beam to both its front side and backside. In our previous work of the present inventors, it was shown that a portion larger than 50% of light can be emitted to the substrate when an OPA when its front side is air and back side is glass. However, as one of the main potential applications of integrated beam steering devices, solid-state LIDAR usually requires a detection range over at least 100 m. The light emitting efficiency of the beam steering devices, despite the development of light source and detector, is directly related to detection range of LIDAR.

Several works have attempted to address the relatively low efficiency challenge. In "1×12 Unequally Spaced Waveguide Array For Actively Tuned Optical Phased Array On A Silicon Nanomembrane" by D. Kowng et al, a structure configuration to emit light from the edge of the chip was utilized. An ultra-converged beam is also achieved in "1×256 Multi-Layer, Low-Loss, Si 3 N 4 Waveguide Optical Phased Arrays With 0.050° Instantaneous-Field-Of-View" by C. Qin et al. Further works aiming to confine the waveguide space to half-wavelength have been done by various approaches. However, these works also employ the configuration of a single waveguide layer. This does offer the convenience of tuning the phase of each waveguide, but the beam emitted by such a configuration is indeed a fan-beam, as the single waveguide layer can only form a 1-D OPA on the edge of the chip. The possibility of emitting a 2D converged beam from the edge (end-fire) requires a 2D OPA on the edge side. Previously, the performance of a 2D end-fire OPA is numerically discussed, and a method utilizing nanomembrane transfer printing to fabricate multi-layer structure with the stop Si layer from SOI wafer is proposed and experimentally proved. Furthermore, a direct writing method based on ultrafast laser inscription (ULI) is applied to achieve a structure for the conversion between single-layer waveguides and 3D waveguides, therefore, a 2D OPA can be formed on the edge side.

In the present disclosure, a 3D structure configuration based on multi-layer $Si_3N_4/SiO_2$ platform is provided to achieve a 2D convergent beam emitted from the edge. The performance of this structure is demonstrated and the present disclosure presents the main improvement on the energy efficiency in both the light input end and emitting end. The influence of vertical crosstalk, the engineering of delay length, and the number of waveguide layers are also investigated.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1A is a front view illustration of the structure where the 3D OPA is formed on the front edge of the device.

FIG. 1B is a side view illustration of the structure of the cross-section of the device, 6 $Si_3N_4$ layers of 800 nm thickness and 5 $SiO_2$ layers of 500 nm thickness.

FIG. 1C is a top view illustration of the structure showing a pattern of each waveguide $Si_3N_4$ layers, contains 9 waveguides with 800 nm width, spacing 2 μm.

Figure 2:
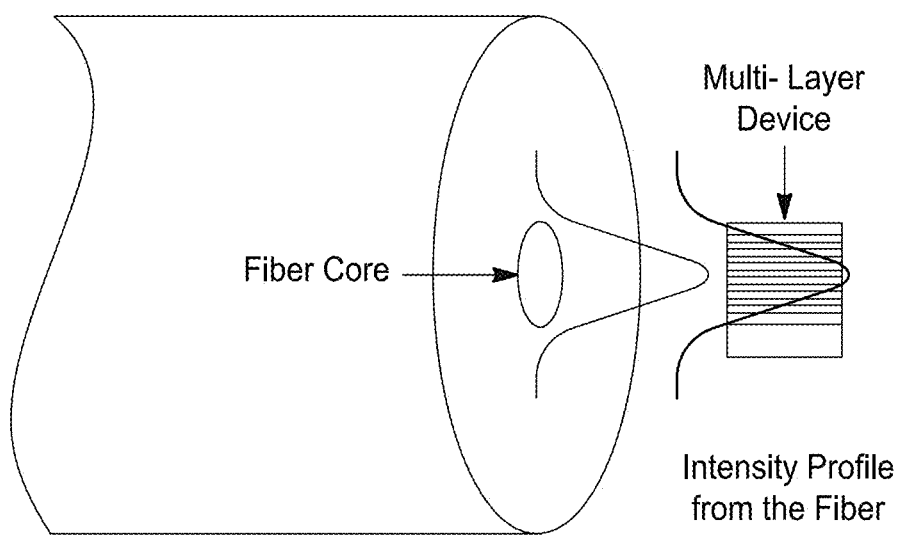

FIG. 2 is an illustration of the apodized intensity profile of the input coupling, the total thickness of the device is equivalent to the MFD of a common single mode fiber.

Figure 3:
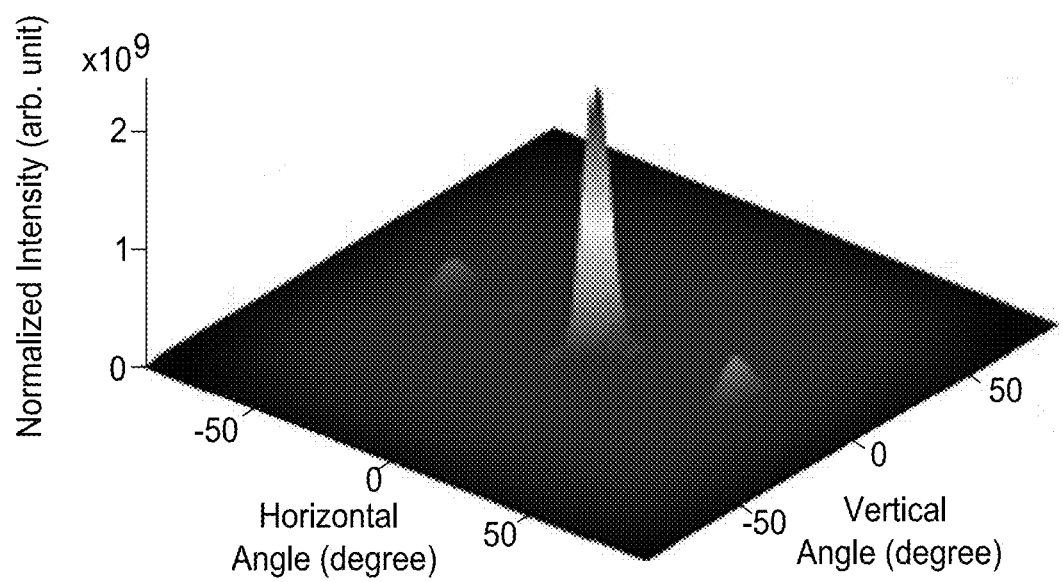

FIG. 3 is a far field pattern of the device at 1550 nm, a clear 2D converged beam is emitted by the device.

Figure 4A:
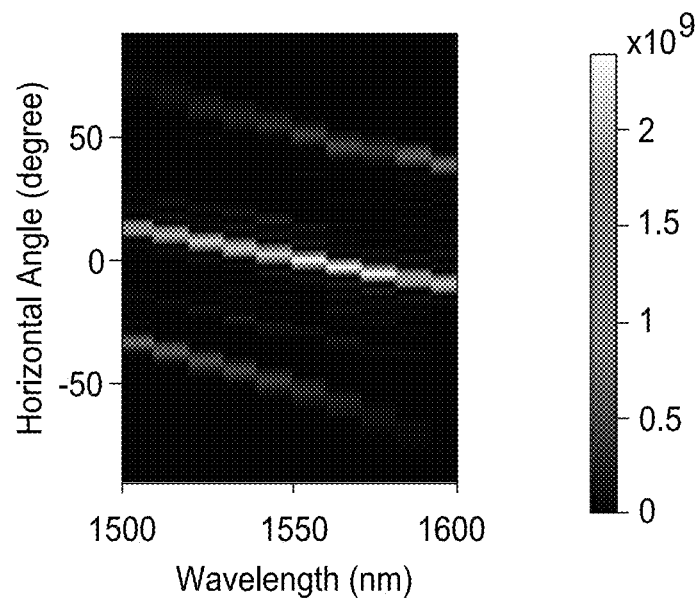

FIG. 4A is a simulation result of the structure in FIGS. 1A-1C showing a horizontal far field contour map, a clear main lobe steers 24.78°/100 nm, two side lobes can be observed.

Figure 4B:
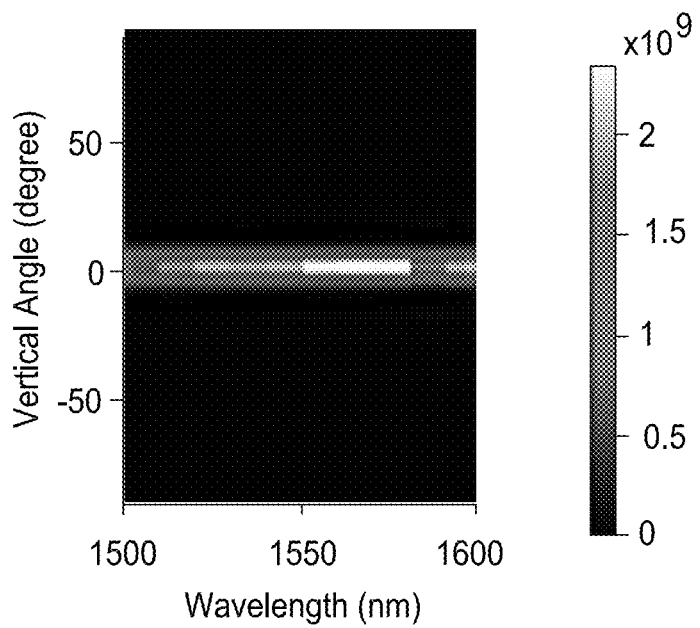

FIG. 4B is a simulation result of the structure in FIGS. 1A-1C showing a vertical far field contour map, only one main lobe exists, no steering vertically.

Figure 4E:
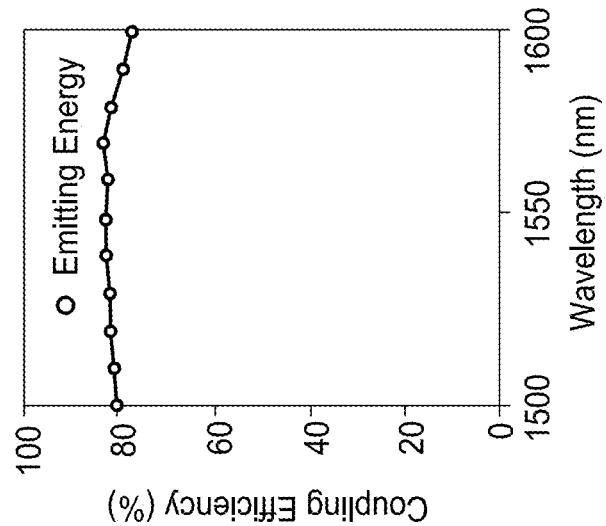
Figure 4D:
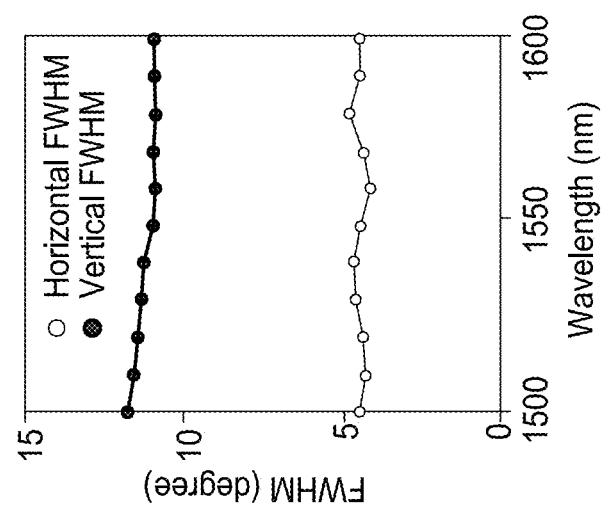
Figure 4C:
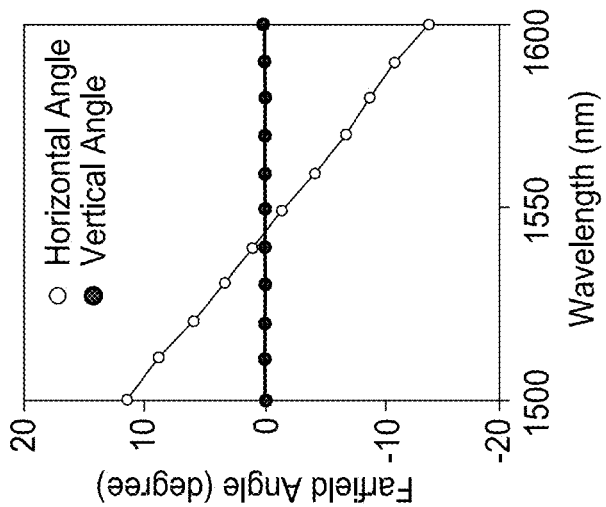

FIG. 4C is a simulation result of the structure in FIGS. 1A-1C showing a comparison between the horizontal and vertical angle.

FIG. 4D is a simulation result of the structure in FIGS. 1A-1C showing a comparison between the horizontal and vertical FWHM.

FIG. 4E is a simulation result of the structure in FIG. 1A-1C showing a coupling efficiency of the total energy emitted.

Figure 5A:
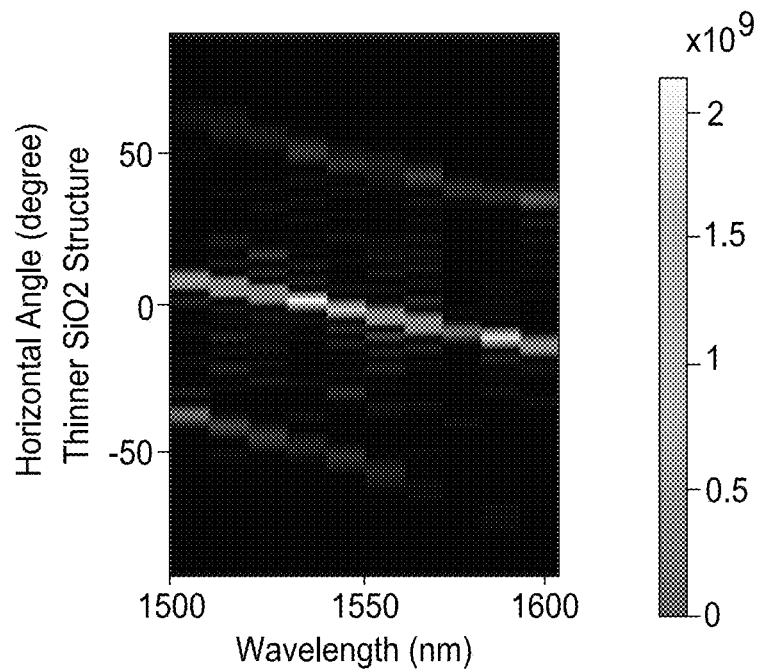

FIG. 5A is a simulation result of the thinner SiO$_2$ structure (8 Si$_3$N$_4$ layers with 650 nm thickness showing a horizontal far field contour map.

Figure 5B:
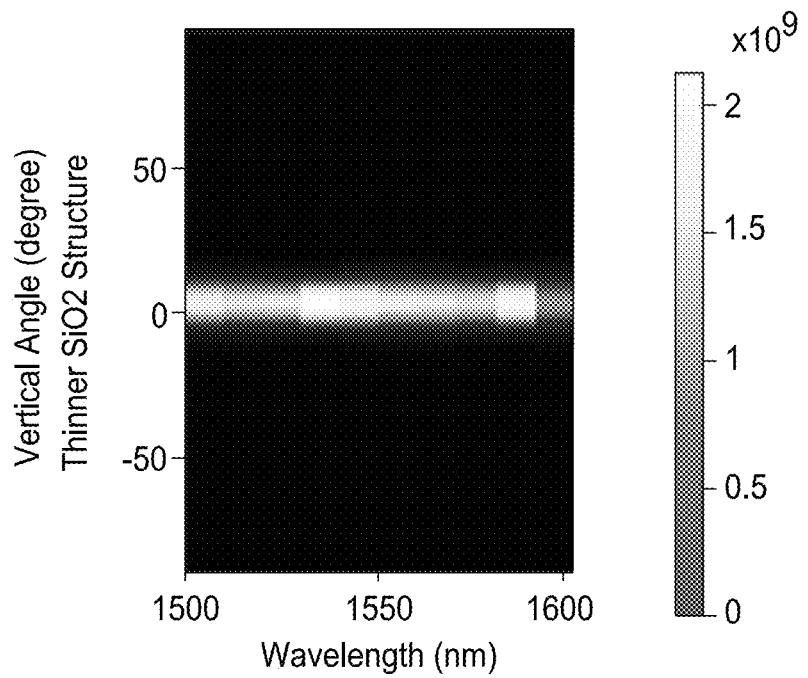

FIG. 5B is a simulation result of the thinner SiO$_2$ structure (8 Si$_3$N$_4$ layers with 650 nm thickness showing vertical far field contour map.

Figure 5E:
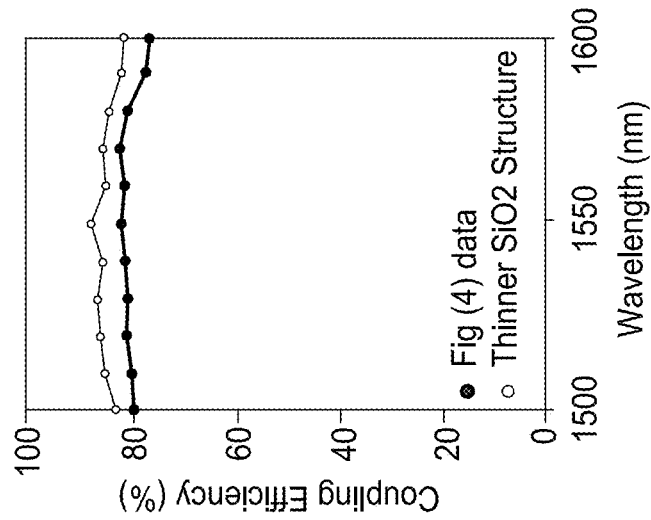
Figure 5D:
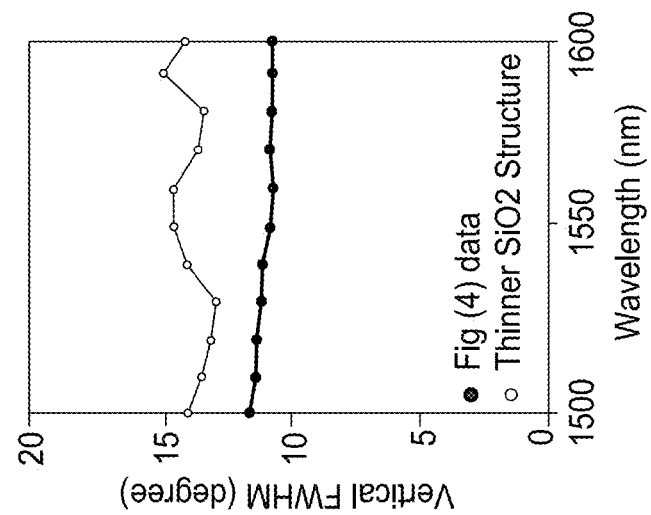
Figure 5C:
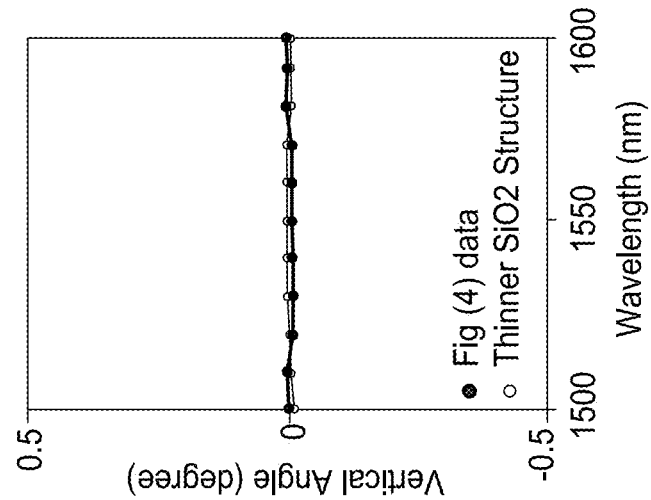

FIG. 5C is a simulation result of the thinner SiO$_2$ structure (8 Si$_3$N$_4$ layers with 650 nm thickness showing a comparison of vertical angle between the thinner SiO$_2$ structure and the original structure.

FIG. 5D is a simulation result of the thinner SiO$_2$ structure (8 Si$_3$N$_4$ layers with 650 nm thickness showing a comparison of vertical FWHM.

FIG. 5E is a simulation result of the thinner SiO$_2$ structure (8 Si$_3$N$_4$ layers with 650 nm thickness showing a comparison of coupling efficiency.

Figure 6A:
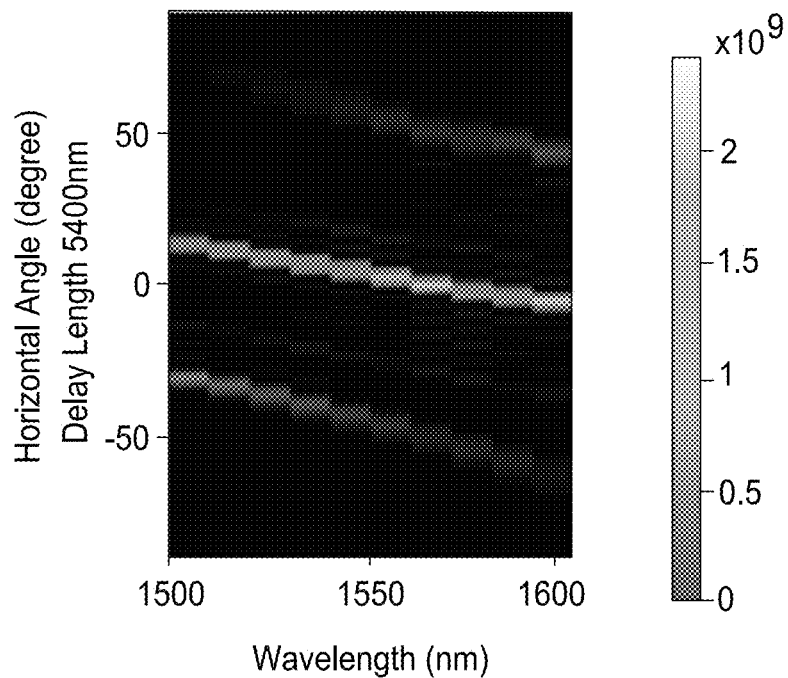

FIG. 6A is a simulation result of structures with different delay length (5400 nm and 7000 nm) showing a horizontal far field contour map of the structure with delay length of 5400 nm.

Figure 6B:
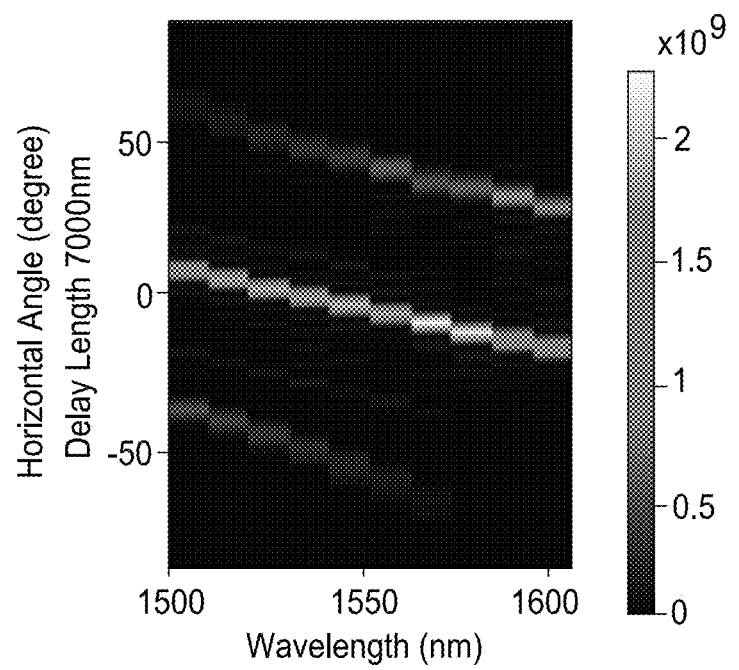

FIG. 6B is a simulation result of structures with different delay length (5400 nm and 7000 nm) showing a horizontal far field contour map of the structure with delay length of 7000 nm.

Figure 6E:
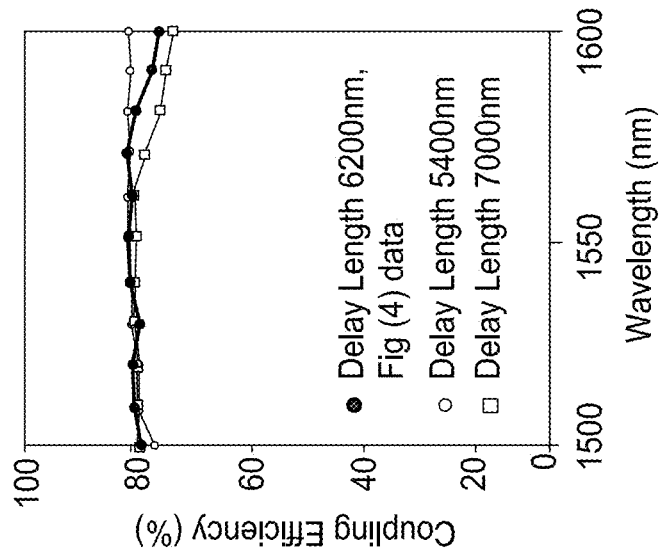
Figure 6D:
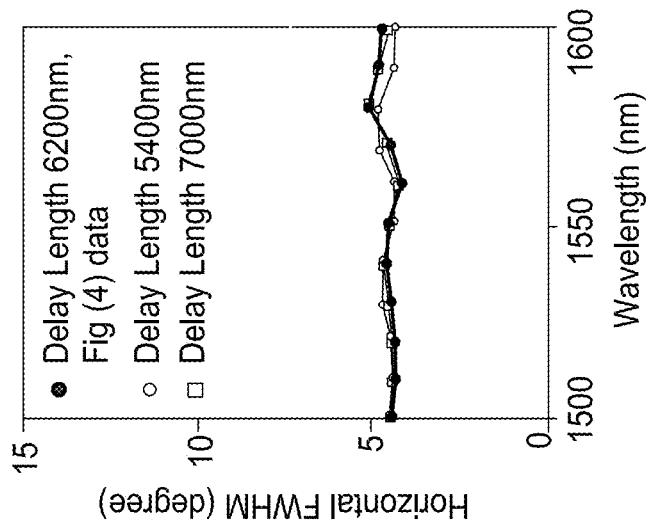
Figure 6C:
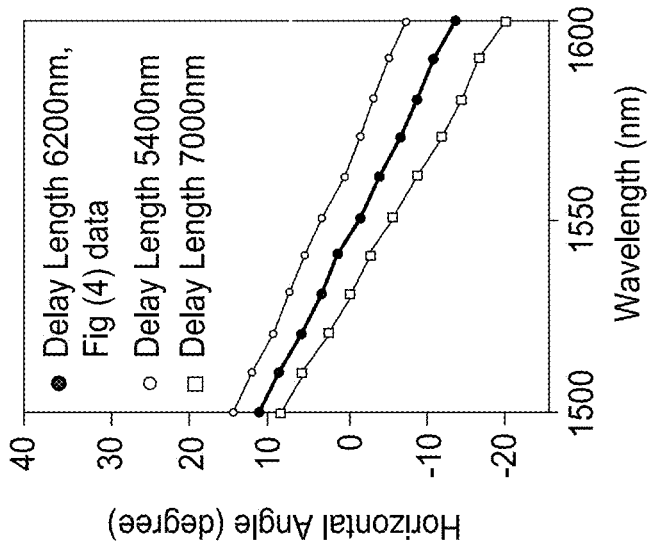

FIG. 6C is a simulation result of structures with different delay length (5400 nm and 7000 nm) showing a comparison of horizontal angle between the structures with different delay length (original 6200 nm, 5400 nm, 7000 nm).

FIG. 6D is a simulation result of structures with different delay length (5400 nm and 7000 nm) showing a comparison of horizontal FWHM.

FIG. 6E is a simulation result of structures with different delay length (5400 nm and 7000 nm) showing a comparison of coupling efficiency.

Figure 7A:
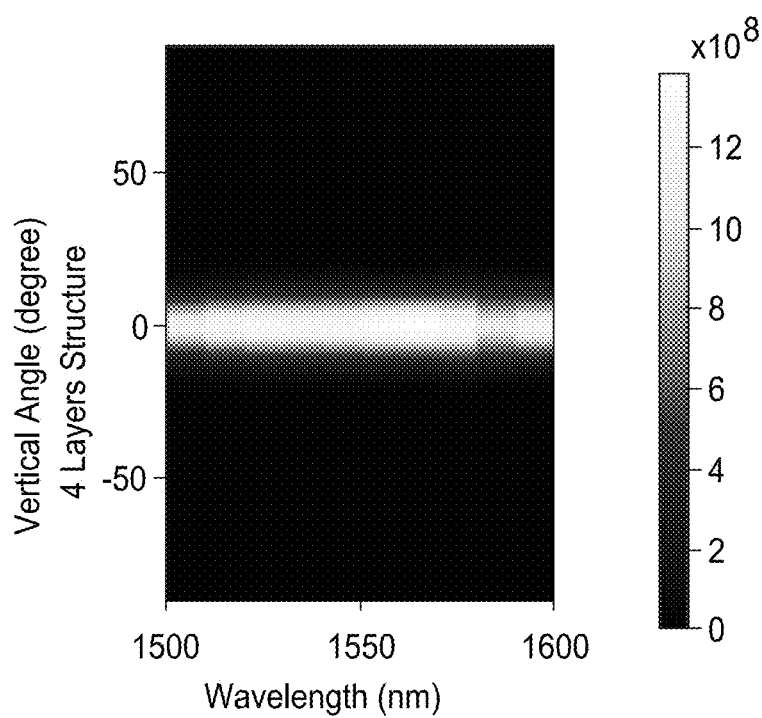

FIG. 7A is a simulation result of structures with different waveguide layers (4 layers and 8 layers) showing a vertical far field contour map of the structure with 4 waveguide layers.

Figure 7B:
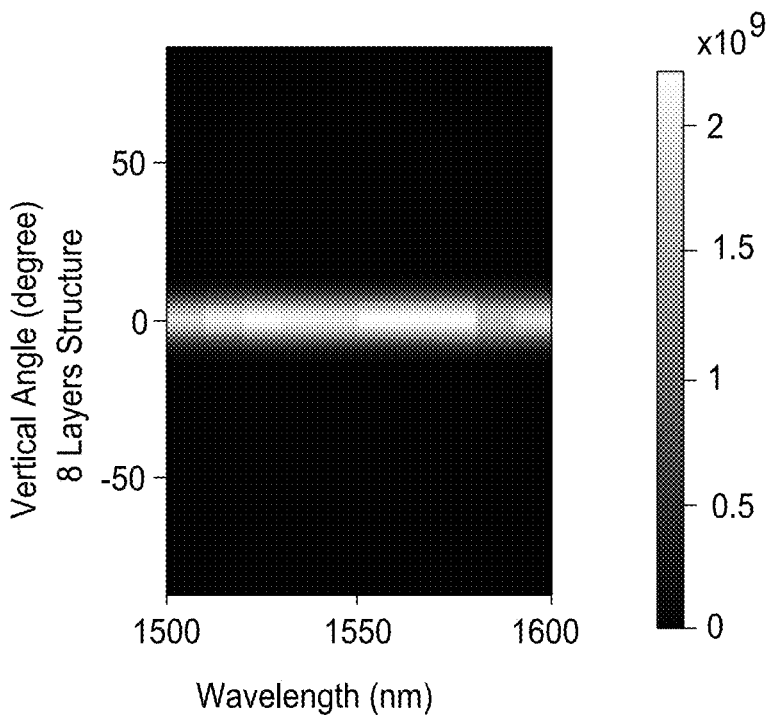

FIG. 7B is a simulation result of structures with different waveguide layers (4 layers and 8 layers) showing a vertical far field contour map of the structure with 8 waveguide layers.

Figure 7E:
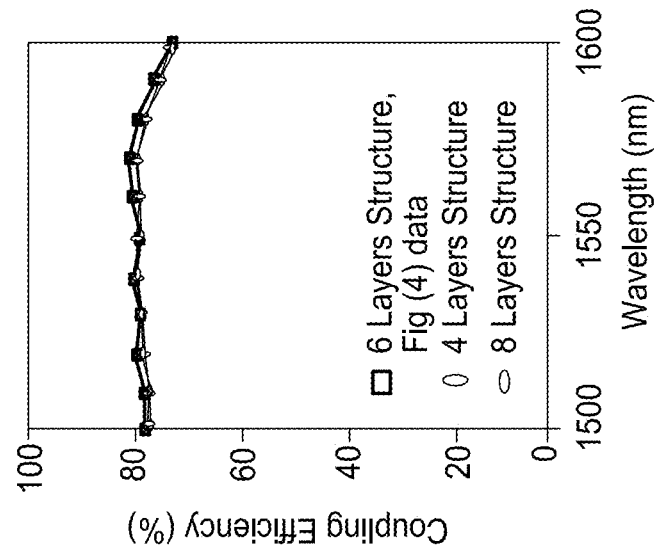
Figure 7D:
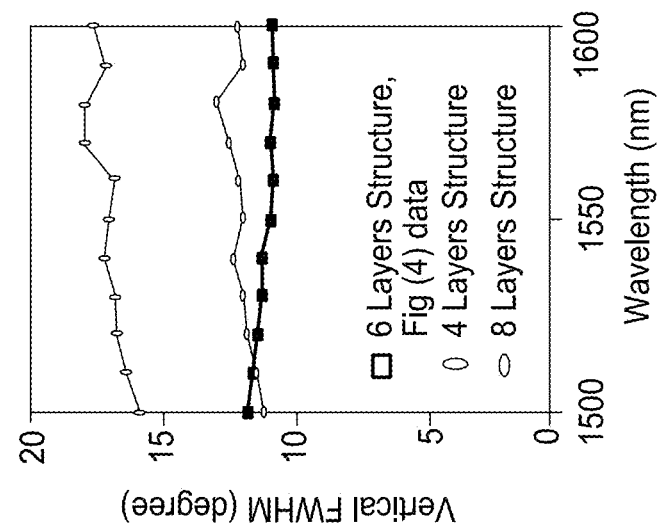
Figure 7C:
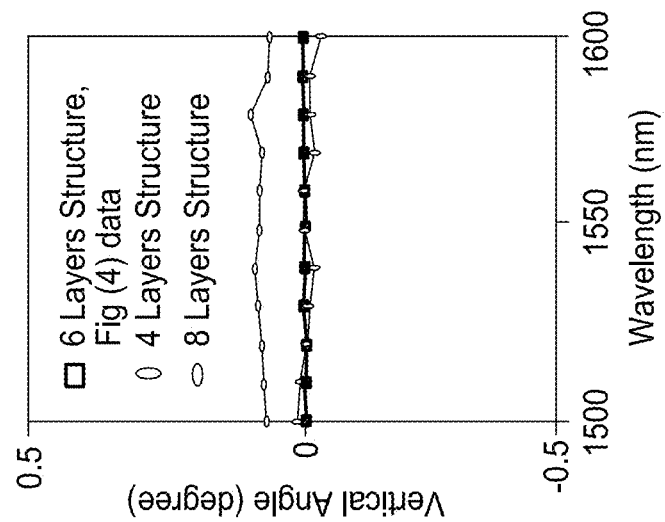

FIG. 7C is a simulation result of structures with different waveguide layers (4 layers and 8 layers) showing a comparison of vertical angle between the structures with different waveguide layers (original 6 layers, 4 layers, 8 layers).

FIG. 7D is a simulation result of structures with different waveguide layers (4 layers and 8 layers) showing a comparison of vertical FWHM.

FIG. 7E is a simulation result of structures with different waveguide layers (4 layers and 8 layers) showing a comparison of coupling efficiency.

Figure 8:
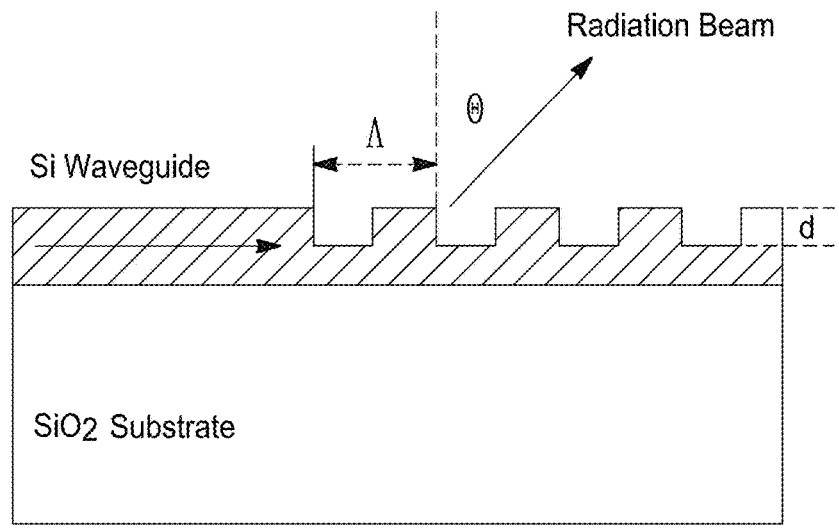

FIG. 8 illustrates a single period grating coupler structure.

Figure 9:
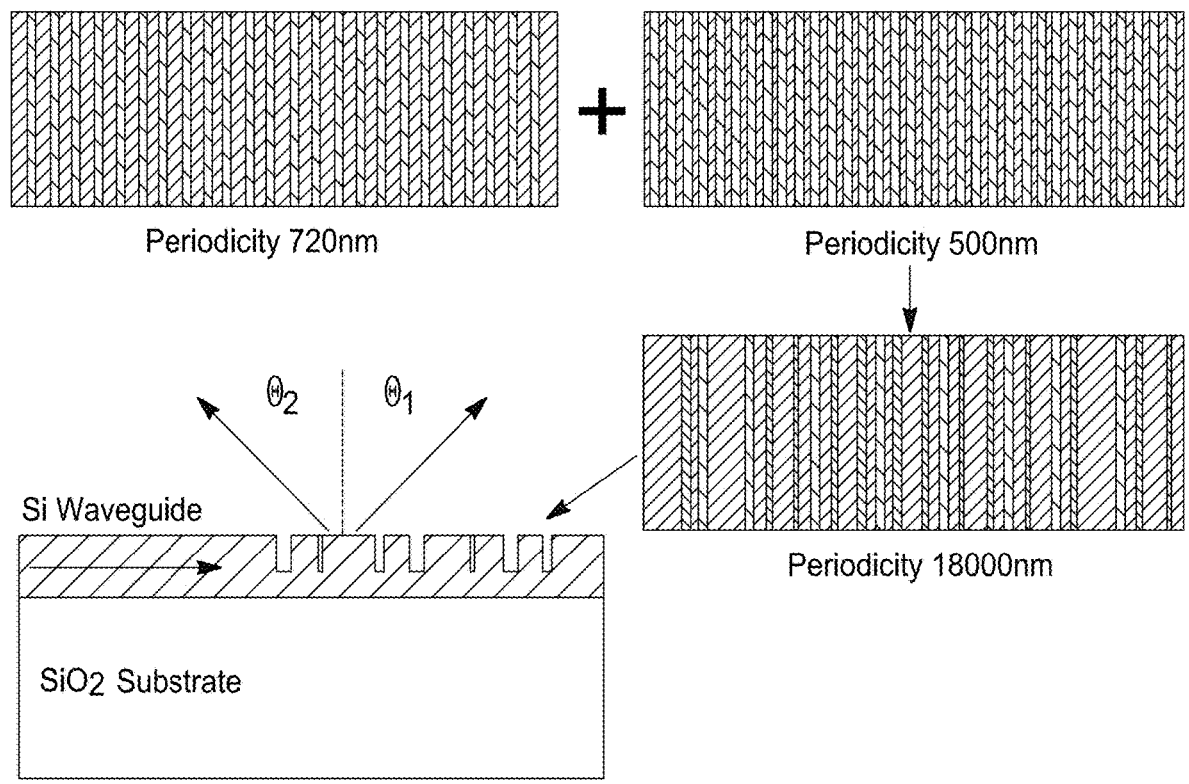

FIG. 9 illustrates a compound period grating coupler structure.

Figure 10:
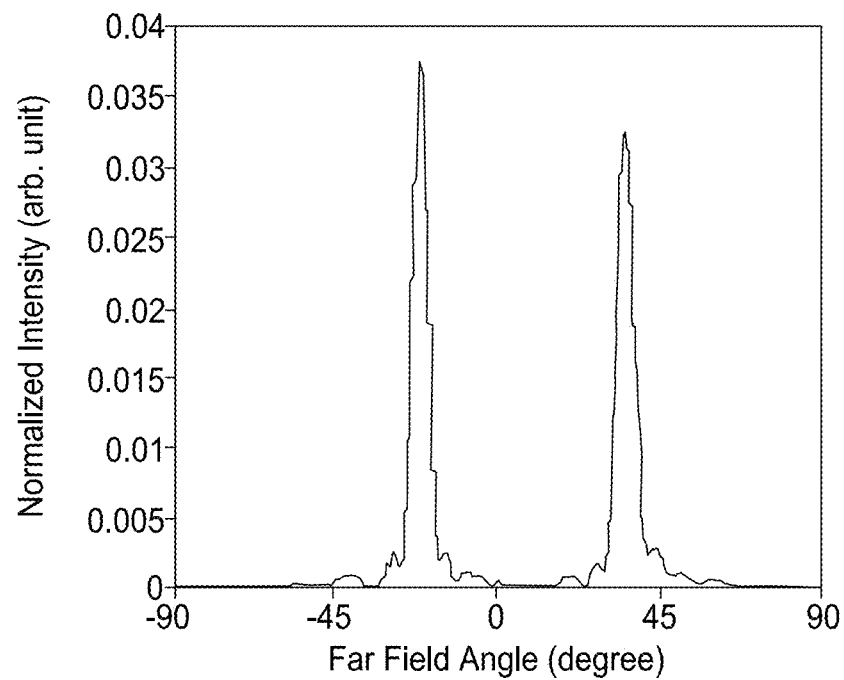

FIG. 10 is a far field simulation result of the compound period grating coupler with applied wavelength of 15550 nm.

Figure 11A:
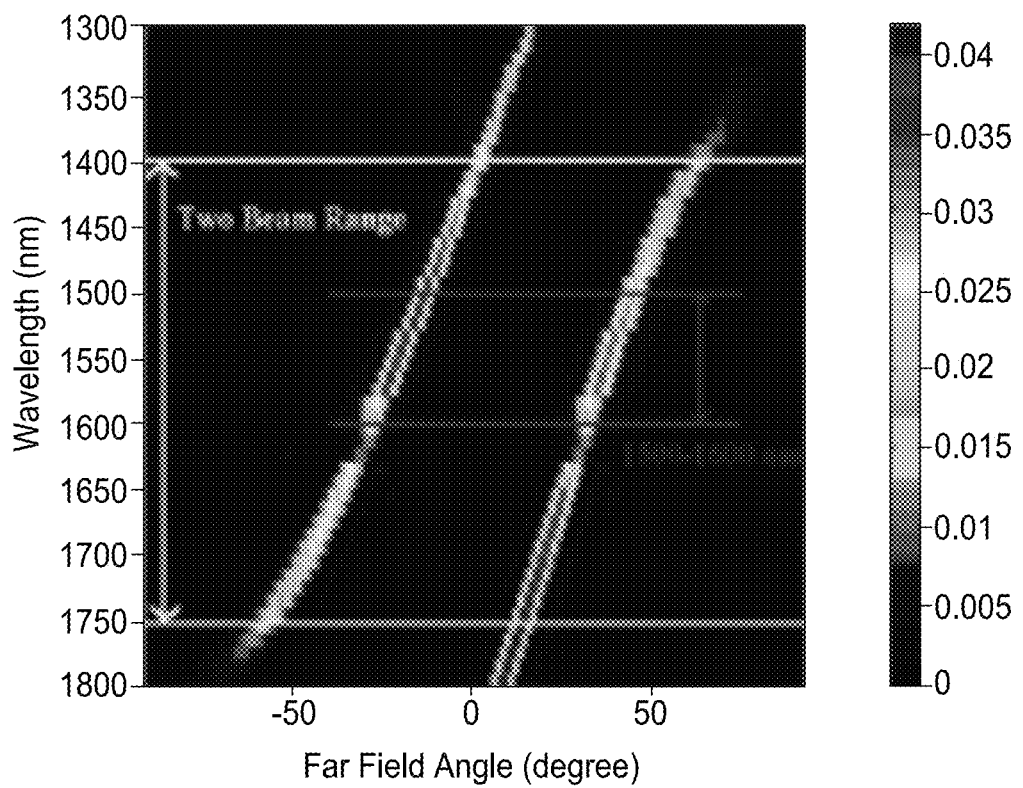
Figure 11B:
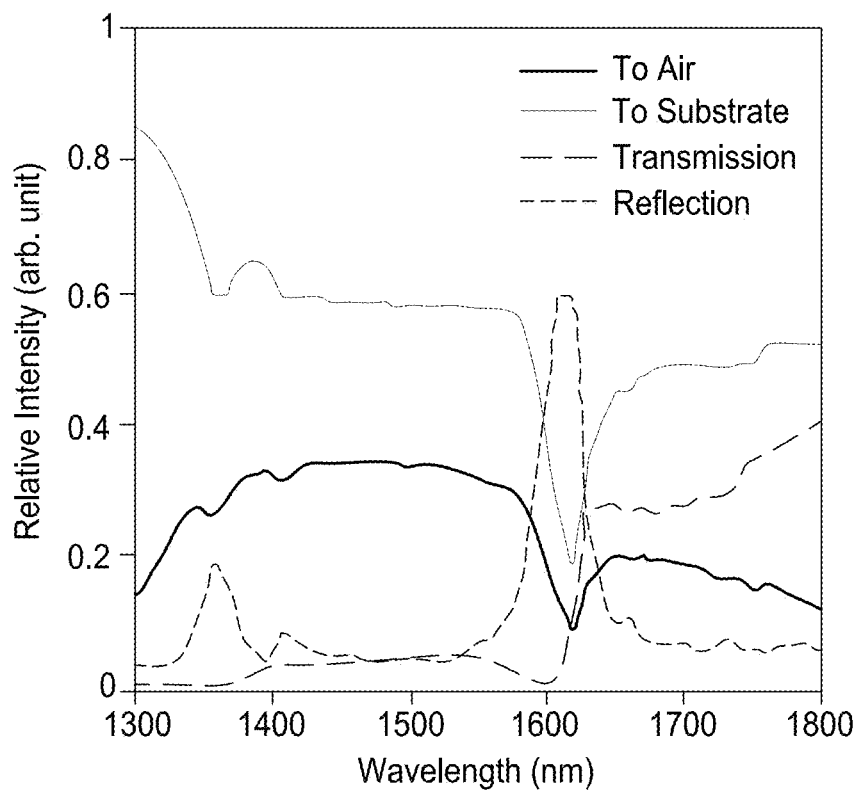

FIGS. 11A and 11B is a far field contour map and an energy flow graph, respectively, of the performance of the compound period grating coupler according to the applied wavelength.

Figure 12:
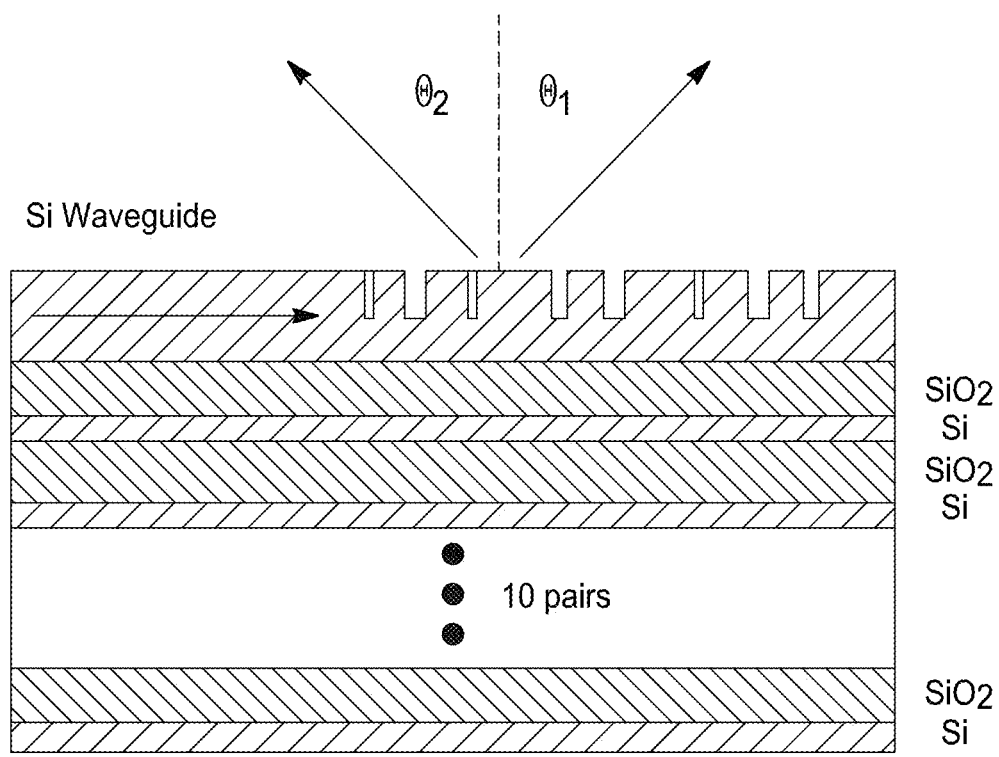

FIG. 12 illustrates the compound period grating structure with DBR substrate.

Figure 13A:
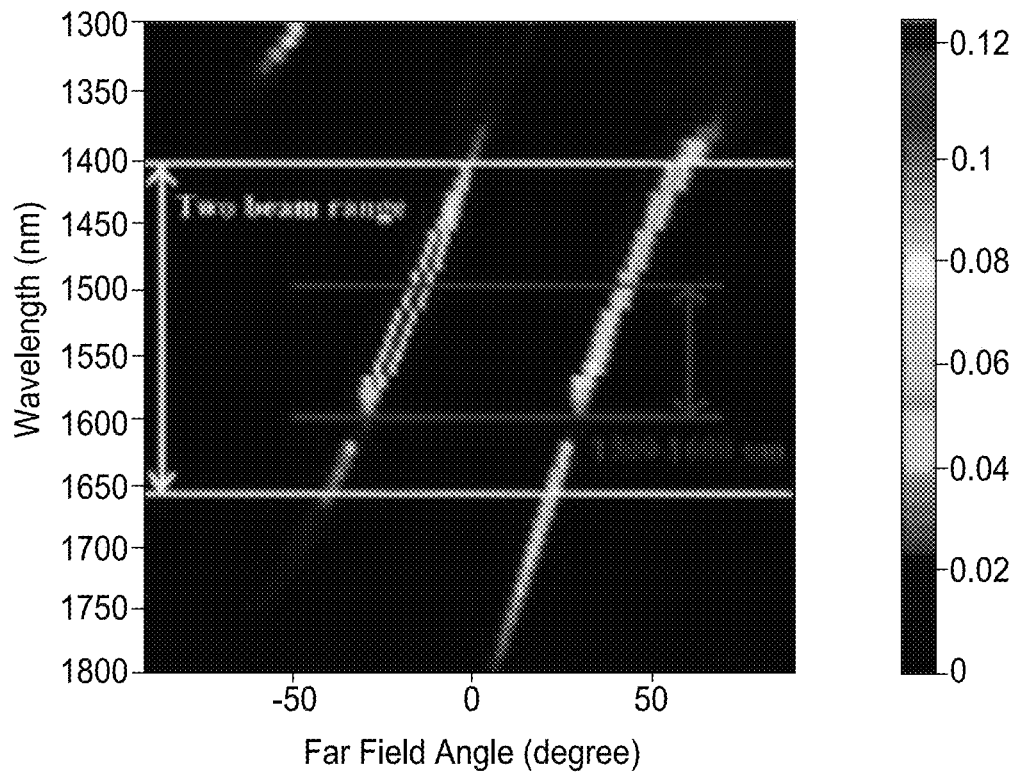
Figure 13B:
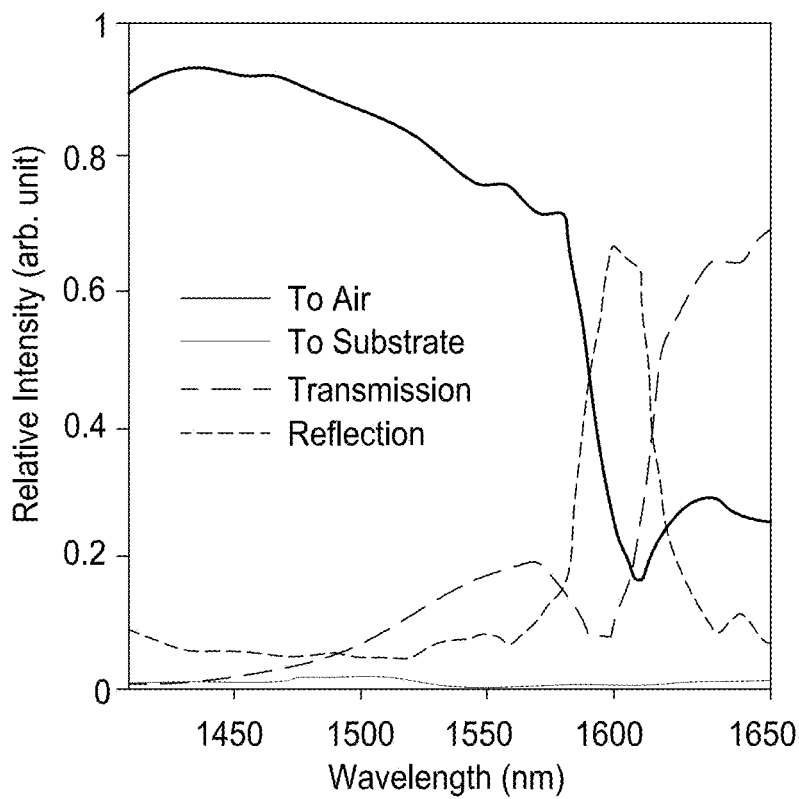

FIGS. 13A and 13B is a far field contour map and an energy flow graph, respectively, of the performance of the compound period grating coupler with DBR substrate according to the applied wavelength.

Figure 14:
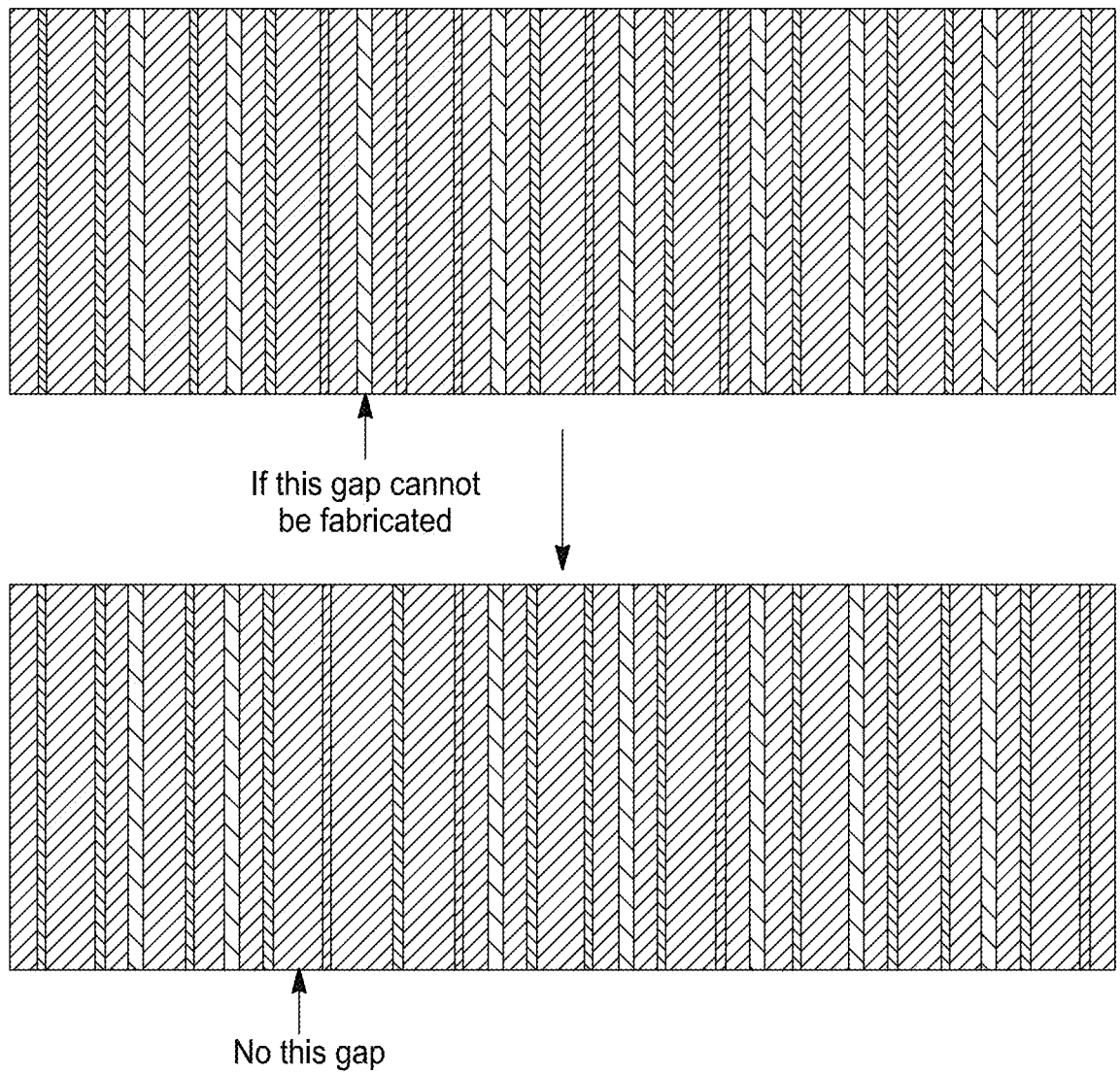

FIG. 14 illustrates the structure if some gaps cannot be fabricated.

Figure 15A:
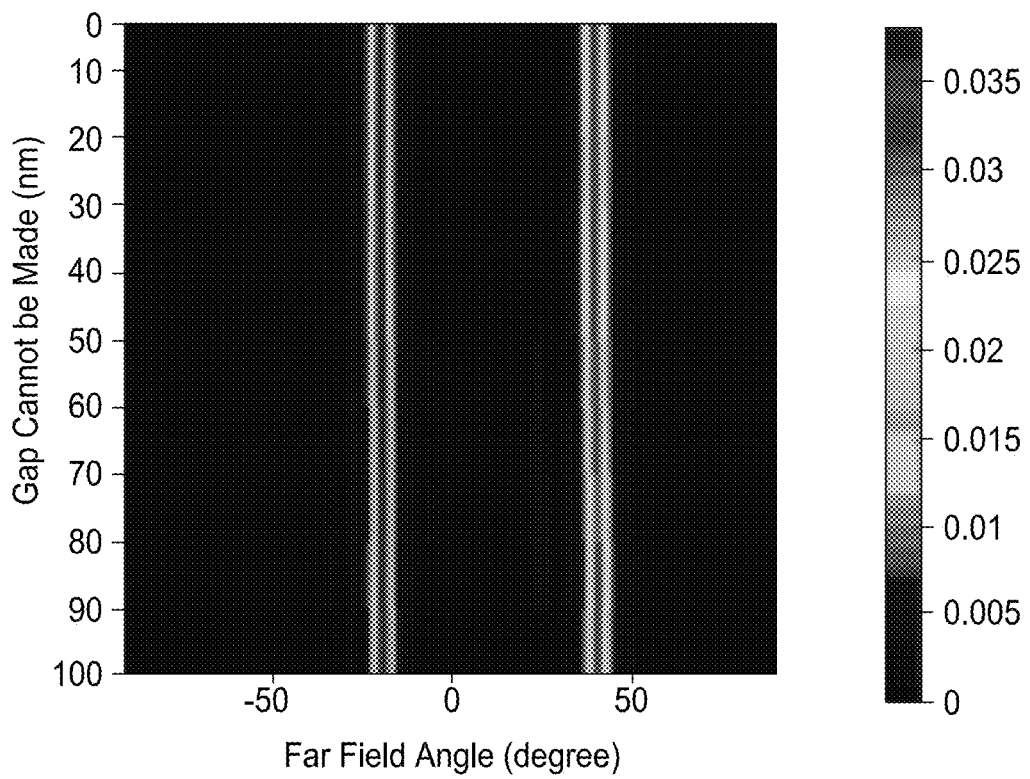
Figure 15B:
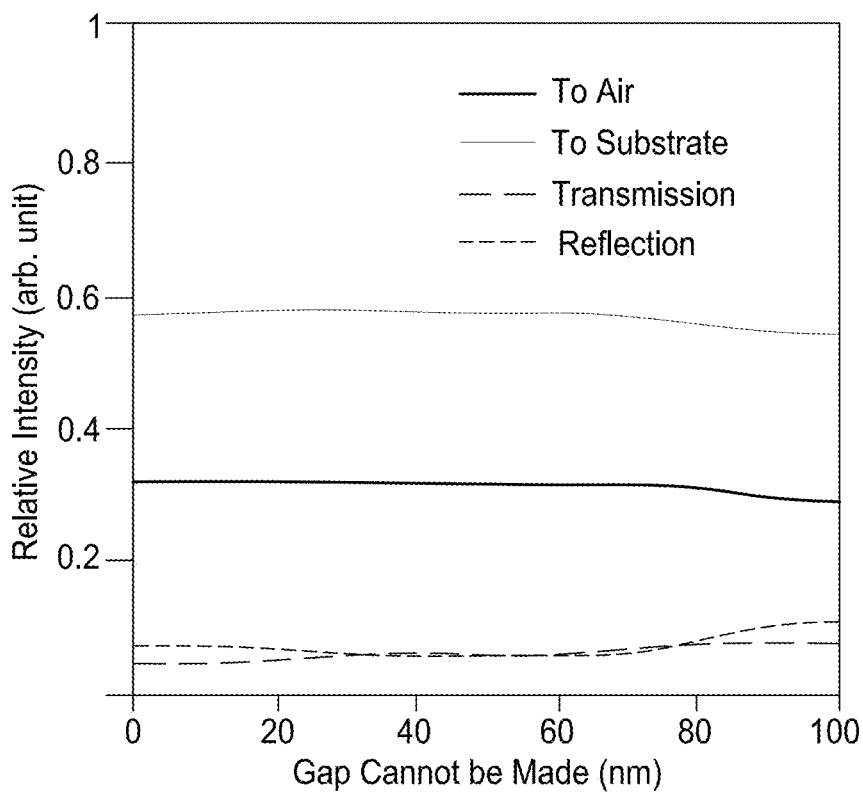

FIGS. 15A and 15B is a far field contour map and an energy flow graph, respectively, of the performance of the compound period grating coupler considering the fabrication tolerance of high aspect ratio gaps according to the applied wavelength.

FIG. 16 illustrates the mechanism of interference.

FIG. 17 illustrates a multilayer structure according to the principles of the present teachings.

Figure 18:
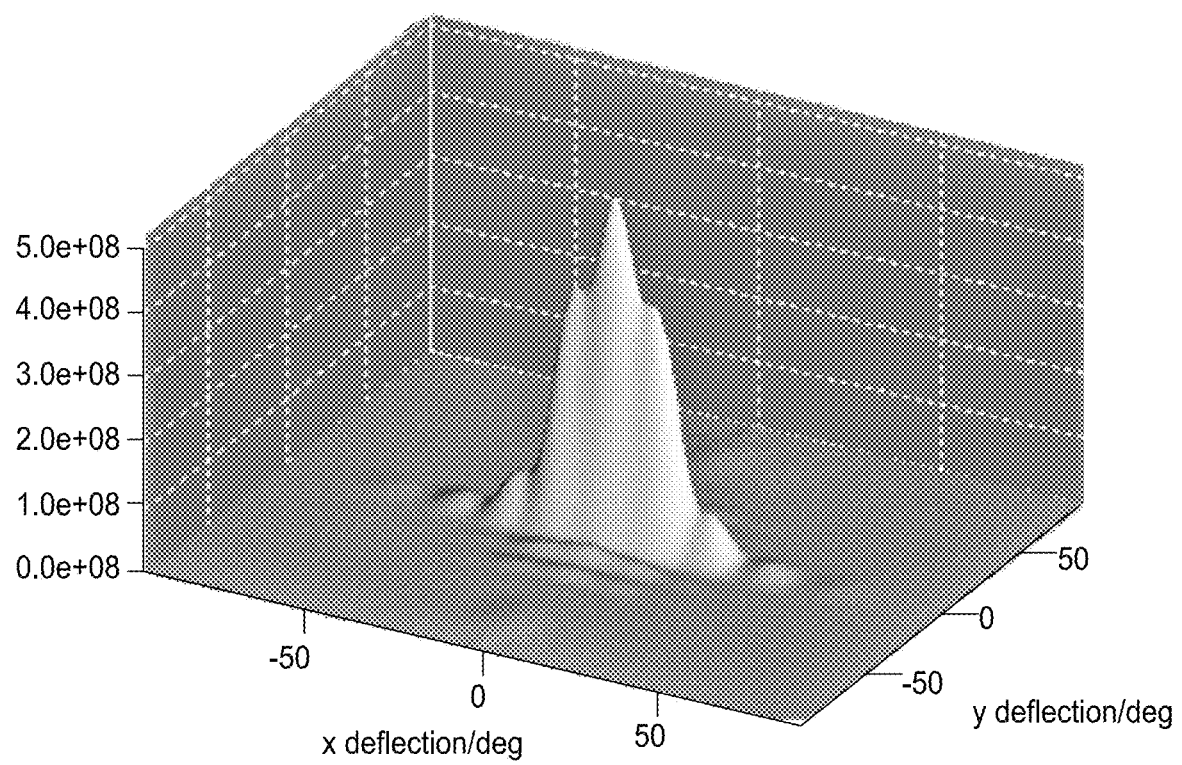

FIG. 18 illustrates a Farfield pattern at 1550 nm with the beam converge in y-direction.

Figure 19:
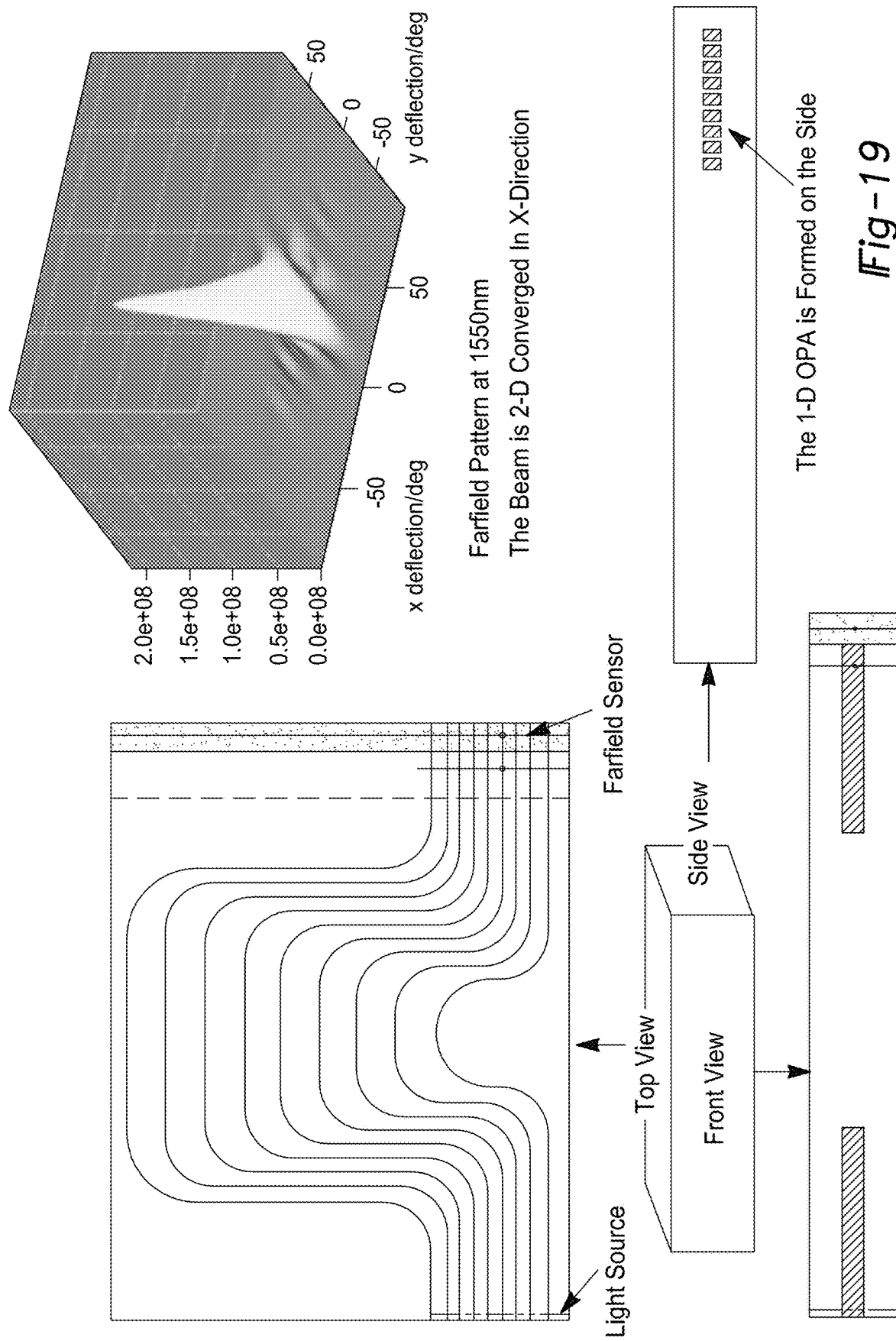

FIG. 19 illustrates a multilayer structure and Fairfield pattern according to the principles of the present teachings.

Figure 20:
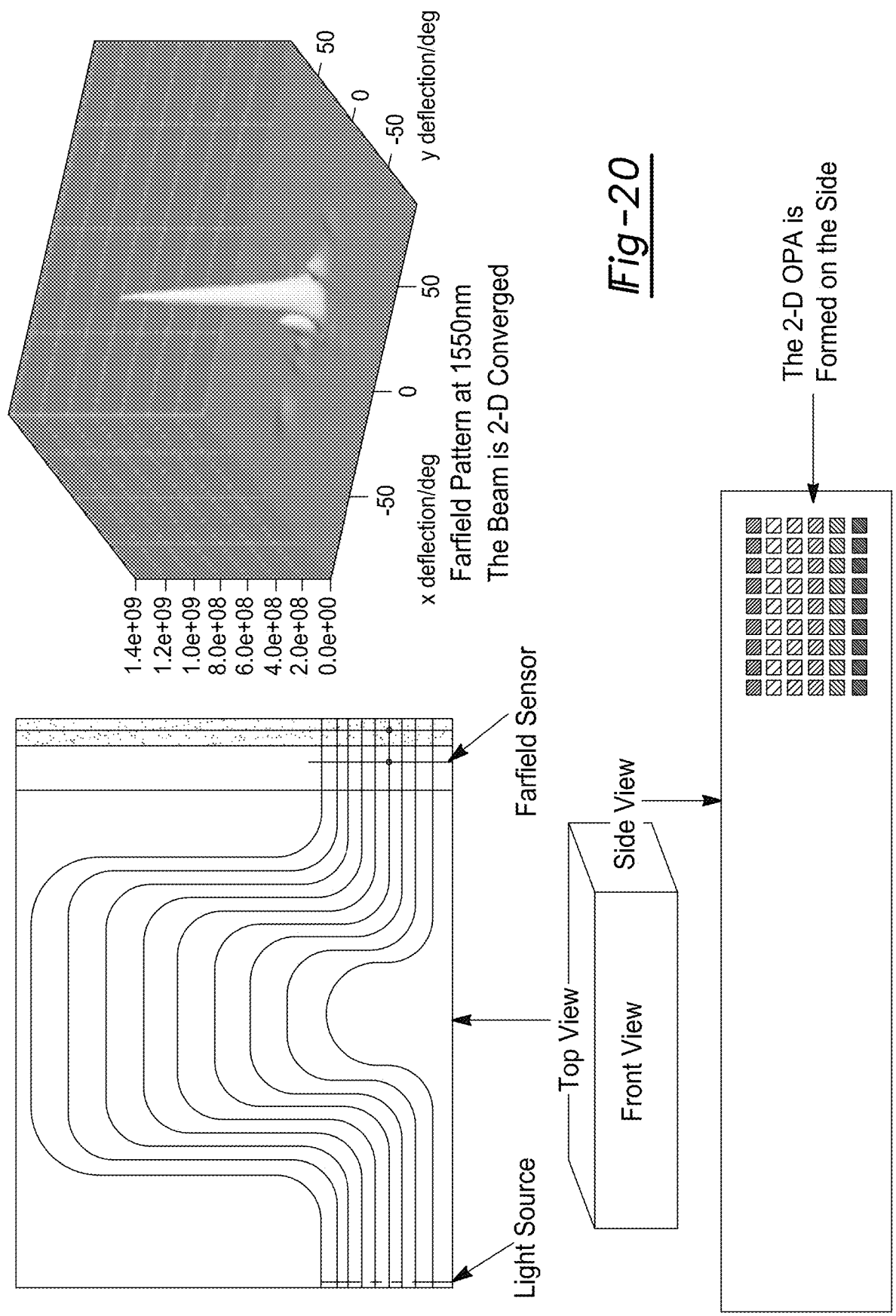

FIG. 20 illustrates a multilayer structure and Fairfield pattern according to the principles of the present teachings.

FIG. 21 illustrates the effects of the combination of beam converge in the x-direction and y-direction.

Figures 22, 23:
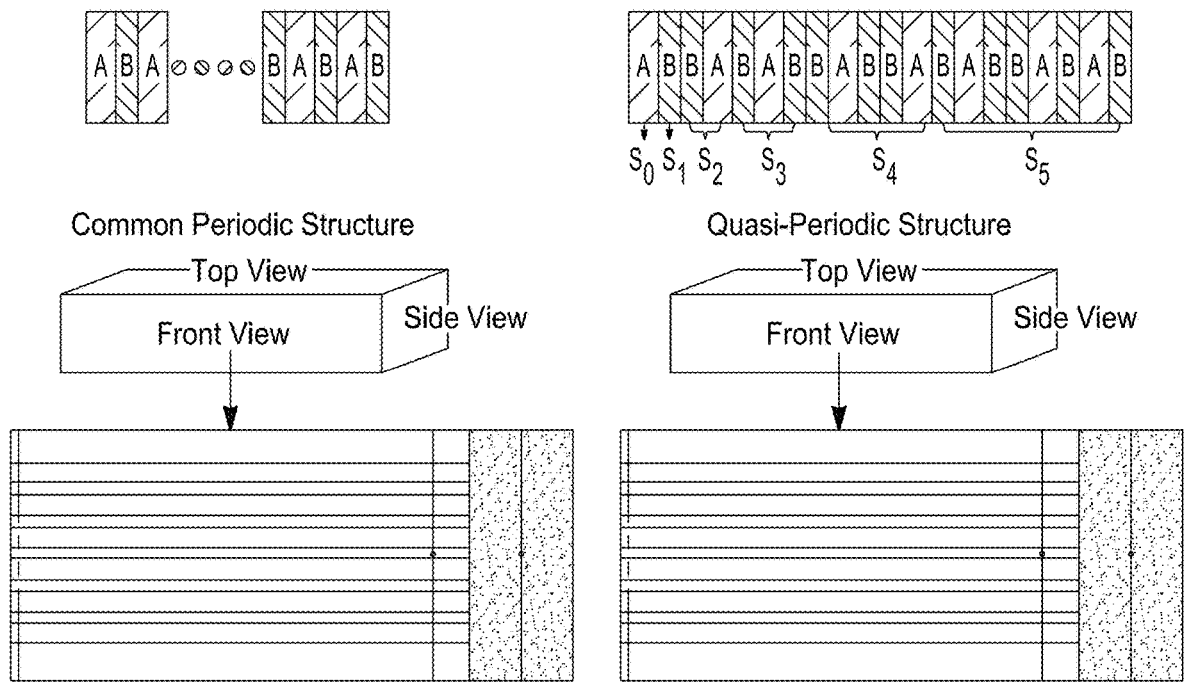

FIG. 22 illustrates the comparison of a common periodic structure and a quasi-periodic structure.

FIG. 23 is a table comparing a common periodic structure and a quasi-periodic structure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to the present teachings, an OPA based beam steering structure is provided to address the detection range issue in LIDAR. Furthermore, in the present disclosure, a 3D optical phased array (OPA) with the light exiting from the edge of the device, which is based on multi-layer $Si_3N_4/SiO_2$ platform, is numerically demonstrated. The CMOS compatible fabrication strategy of this device is discussed. The multi-layer structure can enable a high efficiency from both the input coupling and emitting coupling, the end-fire emitting efficiency can be as high as 82%. A 2D converged beam is clearly generated in the far field pattern of the emitting OPA, which can be steered purely horizontally by wavelength tuning, which suggests a possibility to apply the device to build a multi-line solid state LIDAR. The interrelationship of the 3D OPA structure is studied in detail: the vertical crosstalk does not affect the out-coupling angle; the length of delay line can be engineered to achieve either high steering sensitivity or high steering resolution; the number of waveguide layers can also be engineered as a trade-off between the fabrication complexity and device performance. The two main features, high efficiency and single degree of freedom control, are explained in detail. This work is promising for further study of solid-state beam steering devices and the application of solid-state LIDAR, as well as in other emerging areas, such as wireless communication or optical microscope.

Structure Configuration

According to the present teachings, the structure configuration of the present OPA based beam steering structure is illustrated in FIG. 1A-1C. In some embodiments, the device comprises 6 $Si_3N_4$ layers with thickness of 800 nm, 5 $SiO_2$ layers with 500 nm thickness are sandwiched by the $Si_3N_4$ layers, which is shown as FIG. 1B. Each $Si_3N_4$ layer is patterned, FIG. 1C is the top view of each $Si_3N_4$ layers, 9 waveguides with 800 nm width are placed, the spacing between the center of each waveguides is 2 μm. In the red-circled part, the length of the waveguides is gradually increased by a step of 6200 nm.

The fabrication strategy of this device is discussed as following. This structure can be fabricated on a Si substrate. Firstly, a $SiO_2$ layer can be fabricated. Six (6) patterned $Si_3N_4$ layers have exactly the same pattern can be fabricated, as shown in FIGS. 1A-1C. There are two possible ways to fabricate this multi-layer structure. First, the method proposed in C. Qin, K. Shang, S. Feng, G. Liu, S. Pathak, and S. B. Yoo, "1×256 multi-layer, low-loss, Si 3 N 4 waveguide optical phased arrays with 0.050° instantaneous-field-of-view," 2017 Conference on Lasers and Electro-Optics (CLEO) (pp. 1-2). IEEE (2017, May) can be utilized in this fabrication, the challenge in this method will be the control on the planarization step, this step will influence the thickness of the sandwiched $SiO_2$ layer, while the precise control of this thickness is crucial in this structure. Second, thanks to the identical patterns on each $Si_3N_4$ layer, it is possible to utilize the self-aligning method proposed in A. Hosseini, D. Kwong, Y. Zhang, S. A. Chandorkar, F. Crnogorac, A. Carlson, B. Fallah, S. Bank, E. Tutuc, J. Rogers, R. F. W. Pease, R. T. Chen, "On the fabrication of three-dimensional silicon-on-insulator based optical phased array for agile and large angle laser beam steering systems," Journal of Vacuum Science & Technology B, Nanotechnology and Microelectronics: Materials, Processing, Measurement, and Phenomena, 28(6), C6O1-C6O7 (2010). The fact that $Si_3N_4$ and $SiO_2$ have a low etching selectivity between each, but both have a high selectivity against Si also can help in this method: the selectivity difference offers a possibility to etch down multiple layers of $Si_3N_4$ and $SiO_2$ within the same etching step where a Si is used as the mask. However, the extremely high aspect ratio will be the obstacle here. It is more realistic to fabricate this structure with a combination of the two methods: use the self-aligning method to etch down 2-3 $Si_3N_4$ layers within one step, and then use the multi-step process above to get the 6 patterned $Si_3N_4$ layers eventually. As long as the self-aligning method can handle more than one $Si_3N_4$ layer in one step, (the aspect ratio of the hole in the etching step will be 1.2μ/2.1 μm=0.57 in the case of two $Si_3N_4$ layer and one sandwiched $SiO_2$ layer), the number of the total steps required will be significantly reduced.

After the fabrication of 6 patterned $Si_3N_4$ layers and 5 un-patterned $SiO_2$ layers, a final passivation $SiO_2$ layer is deposited. Following this, the wafer will be diced, and the edge of the die will be polished to ensure the input coupling from the external laser source and the output coupling at the emitting end. As the final step, a quarter-wavelength $SiO_2$ layer (T=1550/5*1.45)=267 nm) will be deposited on the edge side, which can perform the antireflection function between $Si_3N_4$ waveguides and the air. The whole fabrication process follows the standard microchip fabrication process, so the method is CMOS compatible.

In the present disclosure, we only consider 9 waveguides in each layer, and the total periodicity of the array at the emitting end is 2 μm. It is worth noting that even though only 9 waveguides are considered in the present disclosure, it is possible to have more in each layer by the using a beam splitter tree. Then an Ω shape delay length structure can be employed to create phase different between the waveguides. The difference in the length between each waveguides is same, and the 2 μm periodicity can eliminate the crosstalk between waveguides, therefore, the phase difference between each array at the emitting end will be same, which can satisfy the phased array condition in Equ. (1) in each waveguide layers (horizontal direction). In the vertical direction, because of the structure in each waveguide layers are exactly the same, the phase difference between each layers are 0, so this also satisfies the phased array condition between layers (vertical direction). So, this structure is able to emit a beam with 2D convergence from the edge of the device.

In the present disclosure, we only consider 9 waveguides in each layer, and the spacing of the array at the emitting end is 2 µm. It is worth noting that even though only 9 waveguides are considered in the present disclosure, it is possible to have more waveguides in each layer by the using of a beam splitter tree. The convergence of the light can be enhanced by a large number of array elements, so even though the convergence data presented in the present disclosure are obtained from 9 waveguides, it actually is possible to be further improved in principle. Then, an Ω shape delay length structure is employed to create uniform phase different between the waveguides, and the 2 µm spacing can eliminate the crosstalk between waveguides. Therefore, the phase difference between each array at the emitting end will be same, which can satisfy the phased array condition in each waveguide layers (horizontal direction). In the vertical direction, because of the structure in each waveguide layers are exactly the same, the phase difference between each layers are 0, so it also satisfies the phased array condition between layers (vertical direction). As a total result, this structure is able to emit a beam with 2D convergence from the edge of the device. Eq. 1 shows the phase condition:

$$\sin\Theta = \frac{\lambda_0 \cdot \varphi}{2\pi \cdot d'} \quad (1)$$

Where θ is the emitting angle, $\lambda_0$ is the vacuum wavelength, φ and d are the phase difference and spacing between each array elements.

A significant improvement of this structure is the very high-energy efficiency. First, in most of the previous studies, an external laser with single mode fiber is considered as the light source, however, the light will suffer a considerable loss at the input coupling no matter whether a vertical couple or a butt couple is employed. Especially in a butt couple, the loss is usually significant because the thickness of the waveguide layer is usually ten times smaller than the mode field diameter (MFD) of a single mode fiber with a common core diameter of 8.2 µm. In this multi-layer structure, 6 $Si_3N_4$ layers and 5 sandwiched $SiO_2$ layers occupy 7.3 µm vertically, thus, when the light is coupled from the single mode fiber to the on-chip waveguides, the coupling efficiency is much higher than using single waveguide layer structures. A spot size converter using the similar coupling mechanism of A. Hosseini, D. Kwong, Y. Zhang, S. A. Chandorkar, F. Crnogorac, A. Carlson, B. Fallah, S. Bank, E. Tutuc, J. Rogers, R. F. W. Pease, R. T. Chen, "On The Fabrication Of Three-Dimensional Silicon-On-Insulator Based Optical Phased Array For Agile And Large Angle Laser Beam Steering Systems," Journal of Vacuum Science & Technology B, Nanotechnology and Microelectronics: Materials, Processing, Measurement, and Phenomena, 28(6), C6O1-C6O7 (2010), first couples the light from a single mode fiber to a tapered stack of $Si_3N_4/SiO_2$ layers with similar size, then converts the spot shape to be a vertical line after the taper, and eventually couples the light to a Si waveguide with much smaller size than the fiber. Based on their result, the mode overlap between the single mode fiber and the multi-layer spot size converter can be as high as 94%-99%. In that work, the thickness of $Si_3N_4$ layers is 225 nm, while in the present disclosure, the thickness of the $Si_3N_4$ waveguide layers is 800 nm, so the coupling efficiency may not be as high as their result, but we believe it is still obvious that the multiple $Si_3N_4$ layers can contribute to a high input coupling efficiency.

On the other hand, this multi $Si_3N_4$ layer structure can also help in the apodized field distribution. In J. Sun, E. shah Hosseini, A. Yaacobi, D. B. Cole, G. Leake, D. Coolbaugh, and M. R. Watts, "Two-Dimensional Apodized Silicon Photonic Phased Arrays," Optics letters, 39(2), 367-370 (2014), a Gaussian-apodized phased array is utilized to suppress the side lobe, in that work, the apodized field distribution across the array is purposely designed. In the present disclosure, because of the coupling mechanism, the apodized field distribution across each $Si_3N_4$ waveguide layers is automatically formed. This is illustrated in FIG. 2.

The high efficiency is also contributed by the emitting end. From FIGS. 1A-1C, it can be seen that the OPA is formed on the edge of the device, the front side of the OPA is the antireflection coating and air, which is a uniform medium, and an out-coupling beam can be generated by the interference between each array elements. In addition, because of the beam is end-fired to the air, the backward emitting is highly suppressed. From the simulation result, the out-coupling efficiency at the emitting end can be as high as 82%.

In the present disclosure, the FDTD (finite difference time domain) method is utilized to simulate the structure. In the simulation, the model is set as illustrated in FIGS. 1A-1C, and a TM-polarized Gaussian pulse is applied as the light source, the pulse illuminates every waveguides. Wavelength range is set to be 1400 nm to 1700 nm, covering the 100 nm wavelength tuning range. FIG. 3 shows the far field pattern of the device at 1550 nm. It shows that the device generates a clear main lobe at −1.53° horizontally and −6.99E-4° vertically, this lobe has a horizontal FWHM (full width at half maximum) of 4.43° and a vertical FWHM of 10.96°; two side lobes in horizontal direction can be observed at −52.78° and −47.77°. The formation of the side lobes is a result of the large spacing between waveguides in each layers, while because of the periodicity (2 µm) is not too much larger than the wavelength (1550 nm), the side lobes are far away from the main lobe and not strong. On the other hand, the periodicity in vertical, which is the spacing between center of each waveguide layers is 1.3 µm, so only one clear main lobe is generated in vertical direction. The vertical FWHM is larger than horizontal FWHM, this is because the OPA covers only 7.3 µm vertically, but 18.8 µm horizontally.

The wavelength tuning performance of the device is shown in FIGS. 4A-4E. FIG. 4A is the horizontal far field contour map, it shows that the main lobe can be steered by wavelength tuning, the beam is steered from 10.99° at 1500 nm to −13.79° at 1600 nm, a 24.78° steering range in 100 nm wavelength range is achieved. This steering capability is achieved by the delay length structure; the length difference between each waveguides is fixed, so the phase difference between each array element in horizontal direction can be coherently changed by wavelength tuning. FIG. 4B is the vertical far field contour map, there is no length difference between waveguides in different layers, so the phase difference between each array element in vertical direction is always 0 in wavelength tuning, so the vertical far field angle changes only slightly in the whole range, it only changes 3.13E-3°. FIG. 4C shows a comparison between the horizontal and vertical far field angle. The beam steers linearly in horizontal direction with the wavelength variation, and the steering is ignorable in vertical direction. FIG. 4D shows the variation of horizontal and vertical FWHM, the convergence of the beam keeps in the whole wavelength tuning range, the horizontal FWHM varies less than 7.67%, and the vertical FWHM varies less than 7.12%. FIG. 4E shows the coupling efficiency in the tuning range, this efficiency is calculated by using the total energy emitted divided by the energy in all the waveguides right before the emitting OPA. The efficiency at the whole range is higher than 76.43%, this minimum value appears at wavelength of 1600 nm, a maximum value of 82.22% can be observed at wavelength of 1570 nm. Because of the mainlobe dominates in the whole range, the emitting efficiency of the main lobe is close to the efficiency value in FIG. 4E. As discussed in part 2, the high efficiency is contributed by both the end-fire mechanism and the $SiO_2$ antireflection coating.

The tuning function with purely horizontal steering is achieved by the wavelength tuning only. In this device, it is not required to have a precious control of the phase in each waveguides, and hence, the number of degree of freedom required for operation is reduced from N (N is the number of waveguides in each layer) to 1, the operation principle is high simplified. In the application of LIDAR, the traditional mechanical LIDAR rotates the whole device to achieve the horizontal field of view (FOV), and the vertical FOV is achieved by utilizing multiple beam lines vertically, this requires each beam maintains its vertical angle during the rotation. This device can emit a 2D converged beam that can be steered purely horizontally, so it is possible to utilize multiple devices together to build a multi-line solid-state LIDAR.

Influence of Vertical Crosstalk

The spacing between each waveguide in the horizontal direction is selected to be 2 μm to eliminate the crosstalk, this is a consideration of the fact that the phase of light in each horizontal waveguides are different. On the other hand, the thickness of sandwiched $SiO_2$ is set to be 500 nm. Indeed, this thickness cannot fully eliminate the crosstalk between the waveguides in different layers. However, thanks to the same pattern in each waveguide layer, this crosstalk will not contribute to the side lobes. This is because the phase difference between each layers is zero, and the intensity of the light in each layers are comparable, so the vertical crosstalk in the whole system is in a dynamic equilibrium: when the main light pulse in one waveguide induces a delayed pulse in the adjacent waveguide, this waveguide will also receive a delayed pulse induced by the main pulse from that adjacent waveguide, and since the main pulse in each waveguide have zero phase difference, the induced delayed pulse in these waveguides also have zero phase difference. In this case, all the induced pulse can also interfere with each other in the same direction with the out-coupling beam, so it also contributes to the main lobe. Another simulation is done to confirm this, the result is shown in FIGS. 5A-5E. In this simulation, we use 8 $Si_3N_4$ layers of 650 nm, and 7 $SiO_2$ layers of 300 nm, so the OPA still covers a 7.3 μm range vertically, which is the same with the original structure in FIGS. 1A-1C.

The horizontal angle steering range in FIG. 5A is 23.00°/100 nm, this is slightly different from the result in FIGS. 4A-4E, the reason of this difference is the waveguide thickness is changed in this structure, so it will change the effective index of the waveguide; however, the pattern in this structure is the same as the previous one, so the change is not large. FIGS. 5B-5C shows the vertical angle steering of this structure, it can be found, even though the $SiO_2$ layers are only 300 nm thick, the vertical angle of the beam is not influenced by the crosstalk. However, the vertical FWHM and efficiency become larger, this is because that even though the OPA covers the same range vertically, the proportion of waveguide layers is higher, so compared to the original structure used for FIGS. 4A-4E, this structure is more close to a thick slab waveguide with thickness of 7.3 μm. While in either case, the results in FIGS. 5A-5E is a clear evidence to show that the vertical crosstalk between waveguides does not influence the angle of emitting beam.

Engineering of the Delay Length

We have pointed out that the horizontal convergence of the device can be further enhanced by using more waveguides in each layer. So, in the real case, the detection resolution of a wavelength tuned LIDAR depends on the steering sensitivity per wavelength and the wavelength tuning resolution of the light source. In the present disclosure, we select 6200 nm as the delay length of the structure; while in real application, the delay length can be selected larger to increase the steering sensitivity. Two simulation with delay length of 5400 nm and 7000 nm are done, the results are shown in FIGS. 6A-6E.

The difference between the structures in this simulation is in the pattern of each waveguide layer, so only the information about the horizontal angle is plotted in FIGS. 6A-6E. The most important comparison is in FIG. 6C, in this figure, the delay length 6200 nm curve is the same as the horizontal angle curve in FIG. 4C, another curve (as indicated in the legend) is for the structure with 5400 nm delay length and yet another curve (as indicated in the legend) is for 7000 nm delay length. The steering sensitivity of 5400 nm delay length structure is 21.58°/100 nm wavelength, is 24.78°/100 nm for the original device with delay length of 6200 nm and is 28.32°/100 nm for delay length of 7000 nm. This indicates that the steering sensitivity can be changed by selecting different delay length: in most cases, a larger delay length will be preferred to achieve higher steering sensitivity; while in some cases, if the wavelength tuning resolution of the light source is limited, it may require a lower steering sensitivity to increase the detection resolution, this can be done by selecting a smaller delay length. In the meantime, the horizontal FWHM and coupling efficiency do not change much, this is because the spacing between each array element is kept in all the three structures.

Selection of the Number of Waveguide Layers

In the present disclosure, we select 6 $Si_3N_4$ layers to cover a range of 7.3 μm in vertical direction, this is to ensure the total vertical size is similar to the mode field diameter (MFD) of a common single mode fiber. In this structure, the number of waveguides in each layers can be increase by the beam splitter tree, while the number of the waveguide layers is limited by the MFD of the field. On the other hand, as discussed herein, the fabrication of multi-layer structure will become a challenge when more layers are required. So, the selection of how many layers to fabricate will be a tradeoff between the fabrication complexity and the device performance. In the present disclosure, we also investigate this parameter. Two structures, which are the same as the structure used for FIGS. 4A-4E but only different in the number of waveguide layers, are simulated and the results are shown in FIGS. 7A-7E.

In FIGS. 7A-7E, only the information about the vertical angle is plotted, and similar to FIGS. 6A-6E, the 6-layer structure curve in FIGS. 7C-7E is exactly the same as the vertical FWHM and emitting energy curve in FIGS. 4A-4E. As discussed before, the phase difference between each array elements in vertical direction is always 0, so it is no surprise that both the 4-layer structure and 8-layer structure shows similar far field steering curve as the original 6-layer structure. However, in FIGS. 7D, it can be found that the 6-layer structure actually shows the best FWHM result: the 4-layer structure shows a much larger FWHM because of the lack of enough array elements and vertical size; and the 8-layer structure also shows a similar but slightly higher FWHM. The reason that 8-layer structure doesn't shows a better FWHM may because of the vertical crosstalk: it is not an issue in less layer structure, but may become an issue in more layer structure. In FIG. 7C, the vertical angle still doesn't change much in the whole wavelength range, but the whole 8-layer structure curve shifts a little bit to positive, this may also come from the vertical crosstalk. This suggests that 6-layer may already be enough in this structure configuration. On the other hand, the 4-layer structure also shows a clear convergence, even though the FWHM is wider than the 6-layer structure. This may be helpful if there are some applications where the vertical convergence is not critical, then the 4-layer structure will significantly reduce the fabrication complexity.

In accordance with the continued teachings of the present invention, it should be understood that grating couplers are one of the most basic integrated photonic structures. It has raised tremendous research interest due to its outstanding performance in compact nonmechanical beam steering. In accordance with the present teaching, a new compound period grating coupler is presented that is formed by combining two grating structures with different periodicities. The new compound period grating coupler structure can couple the waveguide mode into two radiation modes with different angles. Therefore, the beam steering range is doubled due to the extra beam. We numerically demonstrate this idea, and a 26.20° steering range is observed within a wavelength tuning range of 1500 nm to 1600 nm. The compound period grating structure with DBR (distributed Bragg reflector) as the substrate is also demonstrated, and its energy leakage to the substrate is highly suppressed. In addition, the investigation of fabrication tolerance shows that the new structure can be fabricated with the current CMOS technology.

Introduction

Emerging integrated photonics that studies the generation, processing, and detection of light in chip-scale optical media is one of the most important topics in modern optics research. One crucial topic in integrated photonics is the coupling of optical signals between optical fiber and photonic chips. With a higher coupling efficiency compared to the butt coupler, an easy fabrication process compared to the prism coupler and the tapered butt coupler, the grating coupler has become a promising candidate. A typical grating coupler on an SOI (silicon on insulator) wafer can be fabricated with two-step UV lithography.

Many studies have been done during the past decades, the traditional grating structure is modified in different ways to improve the fiber to chip coupling efficiency. For example, the whole gratings can be designed in shape of parabolas to focus light directly on the waveguide. In, a binary period grating structure is applied to mimic the blazed grating. The polarization independence is achieved by a design of 2-D grating array. In addition, the reflectivity of the substrate interface can be increased by a metal layer, and hence the directionality of the coupling is enhanced. The thickness of the substrate can also be optimized to mitigate the leakage radiation. Recently, a study is reported showing that the coupling efficiency can be as high as 93%.

In recent years, several research efforts utilizing the grating coupler to realize the coupling of light from photonic chips to free space have been undertaken, aiming at realizing spatial scanning with a beam generated from a photonic chip. By designing an array of waveguide grating couplers, the 2-D scanning of free space is achieved. In addition, with the help of photonic crystal to control the phase profile of the waveguide mode, the beam steering range (in unit of degree/nm for wavelength tuning steering) can be further enhanced, or even to eliminate the requirement of real gratings.

In the present disclosure, a novel structure designed with a grating coupler of a compound period is provided to generate two out-coupling beams simultaneously. The novel compound period grating coupler can generate two different series of surface harmonic waves at the same time; hence, the energy in the waveguide mode can couple into two different radiation modes. These two radiation modes both satisfy the grating diffraction equation, so they both will respond to wavelength tuning or refractive index tuning. Therefore, within a certain range of wavelength tuning, each of the two beams demonstrate a steering range that is comparable to the range of the beam from a traditional single period grating coupler, the beam steering range of the new compound period grating coupler is approximately doubled compared to a single period grating coupler.

2. Coupling Mechanism

The traditional grating coupler has a single periodicity. In most studies, concentrating on Si based grating couplers, the device is on a SOI (silicon on insulator) wafer. FIG. 15 shows the side cross-section of a typical SOI based grating coupler, it contains a 220 nm-thick Si waveguide on top of an oxide layer with a thickness of 2 μm. This type of grating coupler is fabricated through two-step UV lithography. The Si layer of 220 nm is etched first to form the waveguide layout; secondly, waveguides are etched for 70 nm to form the grating structure on the waveguides.

The out-coupling angle of this grating coupler structure is governed by the grating equation, which is shown as [2]:

$$k_0 \sin\Theta = \beta_0 + m \cdot \left(\frac{2\pi}{\Lambda}\right) \quad (1)$$

where $\Lambda$ is the periodicity of the gratings; $\theta$ is the out-coupling angle; $k_0$ is the free space wavenumber; $\beta_0$ is the propagation constant of the guided mode in the grating area; and m is the diffraction order, which in most cases is −1. This equation describes the phase match condition between the waveguide mode and the radiation mode. The term $k_0 \sin \theta$ is the projection of the wavenumber of the radiation mode on the waveguide direction. When the propagation constant of the waveguide mode fits $k_0 \sin \theta$, the energy will be able to couple from the waveguide mode to the radiation mode. The grating structure makes this possible as it generates a series of surface harmonic waves due to the periodical spatial fluctuation of the refractive index in the grating area, the electrical field distribution of the waveguide mode can be expressed as the sum of all the harmonic waves [3], that is:

$$E_{grating} = \sum_{m=-\infty}^{\infty} S_m \cdot e^{-j[\beta_0 + m(\frac{2\pi}{\Lambda})]}, \quad (2)$$

where $S_m$ is the amplitude of the mth order harmonic wave, $\beta_0$ is the propagation constant of the fundamental waveguide mode, and $\Lambda$ is the periodicity. Here we label the term $m(2\pi/\Lambda)$ as the altering factor of the harmonic wave. The propagation constant of the waveguide mode is altered by this factor. In a typical grating coupler, one of these altered propagation constants exactly matches the wavenumber of a specific radiation mode, and the other propagation constants don't satisfy this phase match. Therefore, the energy in the waveguide mode is able to couple to this radiation mode, and the coupling efficiency tends to approach unity when the number of gratings increases. The reason that only one propagation constant satisfy the phase match condition is that the term sin θ in Equation 1 has to be in the range of (−1,1).

In principle, if a structure can generate different series of the surface harmonic waves with different periodicity, then the electrical field in the structure can be expressed as:

$$E_{grating} = \sum_{m=-\infty}^{\infty} S_{m_1} \cdot e^{-j[\beta_0 + m_1 2\pi/\Lambda_1)]} + \sum_{m=-\infty}^{\infty} S_{m_2} \cdot e^{-j[\beta_0 + m_2 2\pi/\Lambda_1)]} + \ldots + \sum_{m=-\infty}^{\infty} S_{m_n} \cdot e^{-j[\beta_0 + m_n 2\pi/\Lambda_1)]}, \quad (3)$$

In this case, there is a possibility that more than one harmonic wave can satisfy the phase match condition. Therefore, multiple out-coupling beams will be emitted from the structure.

In the present disclosure, a grating structure is provided in which the configuration of the grating is the combination of two gratings with different periodicities. FIG. 9 shows the structure. We combine 25 gratings with periodicity of 720 nm and 36 gratings with periodicity of 500 nm to form a new grating structure with an envelope periodicity of 18000 nm; here we name the two gratings with single periodicity the component gratings and the new structure the compound period grating. To ensure consistency with previous studies, the grating's thickness is 70 nm; the thickness of the waveguide layer is 220 nm; a 2 μm $SiO_2$ substrate layer is placed below the waveguide layer; and only one envelope period of the compound period grating is considered in this work. The fill factor of the two component gratings is 0.5 and the new compound period grating has a fill factor of 0.64. The refractive index of Si and $SiO_2$ are set to be 3.477 and 1.450 respectively at a wavelength of 1550 nm. In this work, the FDTD (finite difference time domain) is utilized. A sinusoidal pulse with TE polarization is applied to the Si waveguide for the simulation.

Because of the combination of the two periodicities, the electrical field distribution of the waveguide mode becomes the sum of two series of harmonic waves:

$$E_{grating} = \sum_{m=-\infty}^{\infty} S_{m_1} \cdot e^{-j[\beta_0 + m_1 2\pi/\Lambda_1)]} + \sum_{m=-\infty}^{\infty} S_{m_2} \cdot e^{-j[\beta_0 + m_2 2\pi/\Lambda_1)]}, \quad (4)$$

where $\Lambda_1 = 720$ nm and $\Lambda_2 = 500$ nm.

Hence, the phase match condition is satisfied between the waveguide mode and the two radiation modes at the same time. The first radiation mode forms a beam with an out-coupling angle $\theta_1$ that satisfies:

$$\sin\theta_1 = n_{eff} + m_1 \cdot \left(\frac{\lambda_0}{\Lambda_1}\right), \quad (5)$$

and the second radiation mode satisfies:

$$\sin\theta_2 = n_{eff} + m_2 \cdot \left(\frac{\lambda_0}{\Lambda_2}\right), \quad (6)$$

FIG. 10 shows the far field angle distribution of the compound period grating coupler at a wavelength of 1550 nm, calculated using the far field calculator. The intensity in the far field figure is automatically normalized and knowing how much energy is distributed in this far field pattern, we are able to estimate the intensity of each beam. The ratio of the energy coupled to the air relative to the input energy for this wavelength is 31.60%; this ratio of the input energy is distributed in these two beams. The positive value in the far field angle is $\theta_1$ in FIG. 9, and the negative value is the opposite, $\theta_2$.

As shown in FIG. 10, when the input wavelength is at 1550 nm, two beams are generated by the compound period grating structure: the first has a far field angle of 35.67°, normalized intensity of 0.0324, and a FWHM (full width at half maximum) of 5.48°, while the second has a far field angle of −21.38°, normalized intensity of 0.0375, and a FWHM of 4.86°. The first beam is generated by the harmonic wave with the periodicity of 720 nm, and the second is generated by the harmonic wave with the periodicity of 500 nm, noted as Beam 1 and Beam 2 respectively. Beam 2 contains a slightly higher intensity and narrower FWHM, showing a better performance than Beam 1. This is because the 500 nm period grating has 11 more gratings than the 720 nm period grating. The $SiO_2$ substrate has a higher refractive index than the air, so 56.86% of the input energy is coupled to the substrate, which is more than the energy coupled to the air (31.60%). Beside the energy coupled to the radiation modes, 4.86% of the light is transmitted; it keeps propagating inside the waveguide because the grating number of the structure is not large enough to couple out all the energy from the waveguide mode. 7.15% of the input energy is reflected, going to the opposite direction to the waveguide; this is because the spatial fluctuation created by the grating structure also forms a weak DBR (distributed Bragg reflector) structure, which results in the reflection.

To achieve solid-state beam steering, we utilize wavelength tuning in this work. FIG. 11A shows the far field angle contour map of the compound period grating structure versus the wavelength; we tested the wavelengths from 1300 nm to 1800 nm with an interval of 10 nm.

To be consistent with the previous studies, the beam steering range within wavelength of 1500 nm to 1600 nm is analyzed. As shown in FIG. 11A, the red line indicates the beam steering range of the two beams at this wavelength range. Beam 1 varies from 42.59° at 1500 nm to 30.53° at 1600 nm and a beam steering range of 12.06° is achieved with only slight variation of FWHM (e.g. 5.73° at 1500 nm and 5.79° at 1 600 nm). Beam 2 varies from −13.94° at 1500 nm to −28.08° at 1600 nm and the beam steering range is 14.14°. The FWHM of Beam 2 also varies by a negligible value: it is 4.50° at 1500 nm and 5.85° at 1600 nm. The total beam steering range is calculated by adding the two beam steering ranges is 26.20°. As a comparison, the previous study with a single period grating structure achieved a beam steering range of 14.10° in the same wavelength tuning range. On the other hand, the two beams generated by the compound period grating structure have the steering range of 12.06° and 14.14°, they are both comparable to the single beam in the previous work. Therefore, by using the compound periodicity of replace the single periodicity, the total beam steering range of the device is approximately doubled.

The horizontal two beam range line in FIG. 11A indicates the total range of variation of the compound period grating structure. This range is selected because the intensity of both beams are sufficiently high. The total range of the wavelength is 1400 nm to 1750 nm. In this range, the far field angle of Beam 1 varies from 60.94° to 12.48°. When the wavelength is shorter than 1400 nm, Beam 1 gradually vanishes because Equation 4 is no longer satisfied. The FWHM of Beam 1 has a maximum value of 7.90° at 1 400 nm in the two-beams range; this large FWHM is formed because when the out-coupling beam has a larger angle, it becomes harder for the grating structure to converge the energy. The minimum value of FWHM of Beam 1 is 4.53° at 1630 nm, so it can be observed that the Beam 1 is converged in the total two beam range. The far field angle of Beam 2 varies from 1.18° at 1400 nm to −58.02° at 1750 nm, and the whole steering range is 59.20°, which is 10.74° higher than Beam 1. This is because Beam 2 is created by the surface harmonic wave with periodicity of 500 nm, while the surface harmonic wave for Beam 1 has a periodicity of 720 nm. Therefore, according to Equations 4 and 5, the sensitivity of the far field angle to the wavelength of Beam 2 is higher than Beam 1. The FWHM of Beam 2 has a maximum value of 8.67° at 1750 nm and a minimum value of 4.07° at 1410 nm.

In summary, from 1400 nm to 1750 nm, Beam 1 covers the angle from 60.94° to 12.48° and Beam 2 covers from 1.18° to −58.02°; a total steering range of 107.66° is achieved with a wavelength tuning range of 350 nm (1400 nm to 1750 nm). In addition, the center angle range from 1.18° to 12.48° can also be covered in two approaches: one is to utilize Beam 1 at wavelengths higher than 1750 nm and the other is to utilize Beam 2 at wavelengths lower than 1400 nm.

The normalized intensity of the two beams is shown by the color map in FIG. 11A which is calculated by the far field calculator. FIG. 11B shows the energy flow of the whole system where the first line in the legend is the energy coupled to the air and shows how much energy is distributed in the two beams according to the wavelength; the second line is the energy coupled to the SiO2 substrate, which is higher than the energy to the air in the whole range; the third line shows the transmission; and the fourth line shows the reflection.

In FIG. 11A, both of the two beams are both weak at the wavelength around 1610 nm and FIG. 11B shows that a notable reflection peak appears at this wavelength where 59.29% and 58.61% of the energy is reflected at 1610 nm and 1620 nm, respectively. This may be because the two surface harmonic waves with periodicity of 720 nm and 500 nm both form a weak DBR structure and they both show a high refection at this wavelength, thus resulting in an especially high reflection peak at the wavelength at 1610 and 1620 nm. On the other hand, the lowest value of the energy coupled to the air is 9.00% at the wavelength of 1620 nm, while the highest energy to the air in the two-beams range is 34.30% at the wavelength of 1470 nm; thus, the lowest energy coupled to the air (9.00%) is 26.24% of the highest (34.30%). Considering that the energy is shared approximately evenly by the two beams at the wavelength of 1620 nm, we estimate that the intensity of the two beams at this wavelength are still adequate to be detected. It can also be observed from FIG. 11 that when the wavelength is close to 1300 nm or 1800 nm, one of the two beams gradually vanishes, resulting in a reduction of the energy coupled to the air. When the energy to the air drops, the reduced part of the energy either couples to the substrate or stays in the waveguide mode. In summary, it can be concluded that the compound period grating structure has a good performance in the whole two-beams range.

3. Compound Period Grating Structure with DBR Substrate

One serious problem of the grating coupler with SiO$_2$ substrate is that when the energy is coupling from the waveguide mode to the air, the energy leakage to the substrate can reach over 50%. The reason for this problem is that the SiO$_2$ substrate has a refractive index higher than 1, so it is easier for the energy to couple to the substrate than to the air. From FIG. 11 (b) it can be observed that there is a considerable amount of energy coupled to the substrate. This problem also happens when the grating coupler is used for fiber to chip coupling, one possible solution for this problem is to utilize a metal layer at the substrate to suppress the energy leakage. In this work, we utilize the DBR (distributed Bragg reflector) structure as the substrate to achieve the energy leakage suppression and remain the device to be Si based only. FIG. 12 illustrates the compound period grating structure with a DBR substrate.

In this work, Si and SiO$_2$ are selected to create the DBR structure with a center wavelength of 1550 nm. The thickness of the Si and SiO$_2$ layer are set to be 111.45 nm and 267.24 nm, respectively. Ten pair of the Si/SiO$_2$ stacks are applied in this work. To fabricate such a device, a more complicated procedure will be need. First, DBR with ten pair of the stacks will be fabricated. Then, the top surface of a SOI wafer will be bounded to the DBR layers, and the buried oxide layer and substrate Si layer will be eliminated by dry etching. Ultimately, the grating coupler structure will be fabricated on the left Si layer. This complicated procedure will ensure that the grating coupler is fabricated from a single crystalline Si layer.

FIG. 13 shows the far-field angle contour map and the energy flow diagram of this structure. From FIG. 13A, it can be observed that the total two beam range is reduced, the beam steering range of the two beams is 73.70° in total. The red arrow shows the beam steering range of 26.67° within the wavelength of 1500 to 1600 nm is similar to the SiO$_2$ substrate structure.

From FIG. 13B, the most important advantage of the DBR substrate structure can be seen, namely, the energy leakage to the substrate is suppressed in the whole two-beam range. The DBR structure is a typical 1-D photonic crystal, as a result, the energy in the waveguide mode is almost impossible to couple to the radiation mode to the substrate. In this case, the intensity of the two beams coupled to the air is enhanced. It can be noticed from FIG. 13B that as the wavelength becomes greater, the grating coupler shows a reduced ability to couple the energy from the waveguide mode to the radiation mode; this problem could be solved by increasing the period number of the grating coupler. In this work, the compound period grating contains 25 of the 720 nm periodicity gratings and 36 of the 500 nm periodicity gratings, and as a result, the transmission energy reaches over 50% when the wavelength is larger than 1590 nm.

In summary, the compound period grating structure with DBR substrate shows an extremely low energy leakage, while the total beam steering range is also suppressed due to the enhanced waveguide mode in the longer wavelengths. This gives us the potential to make a tradeoff between the beam intensity and beam steering range, depending on the real application of the device.

4. Fabrication Tolerance

In this work, the two component gratings are combined to form a compound period grating structure. However, the compound period grating structure contains several gaps whose widths are extremely small. The smallest gap has a width of 10 nm, and considering that the depth of the grating is 70 nm, the aspect ratio of this gap is 7; structure with this high aspect ratio and small feature size is hard to fabricate using CMOS processing technology. On the other hand, the coupling between the waveguide mode and the radiation mode is achieved by the surface harmonic wave, therefore, the disappearance of some of the gratings in a large number of gratings will weaken the surface harmonic wave but not eliminate it.

Thus, we can predict that, if some of the narrow gaps cannot be fabricated, the whole performance of the device will not change too substantially. FIG. 14 illustrates what the structure is like if some of the gaps cannot be fabricated.

FIG. 15 shows the far field contour map and the energy flow diagram when some of the gaps are not able to be fabricated. The traditional $SiO_2$ substrate structure is considered in this result. Here we test all the gaps with a width under 100 nm, because a gap with 100 nm width and 70 nm depth can be in principle fabricated with current COMS processing techniques.

In FIG. 15A, it can be observed that the far field angle of Beam 1 is 35.67° when all the gaps can be fabricated, and that it varies to 36.57° when all the gaps under 100 nm cannot be fabricated. A slight increase of the far field angle occurs because the total effective refractive index is also increased when the air gaps are replaced by Si. The FWHM of Beam 1 has almost no variation. Beam 2 has the same trend as Beam 1: the far field angle in FIG. 15A varies from −21.38° to −20.42°.

FIG. 15B shows the energy flow diagram of the result. It can be observed that all the lines are approximately flat; the energy to the air varies from 31.60% to 28.97%, making the difference negligible. Therefore, it can be concluded that the compound period grating structure has a non-demanding fabrication tolerance.

5. Conclusion

In accordance with the present teachings, the compound period grating structure has been shown and numerically demonstrated. With this design, the traditional grating coupler can be modified to generate two out-coupling beams simultaneously and because of the extra beam, the beam steering range of the device is doubled. A total beam steering range of 26.20° is achieved within a wavelength tuning range of 100 nm (1500 nm to 1600 nm). In addition, this result can potentially be improved through optimization and by combining with other studies, such as using the photonic crystal as the waveguide. Furthermore, the DBR substrate structure study shows an enhanced beam intensity while the steering range is slightly suppressed. It is shown that there exists a tradeoff between the beam intensity and the beam steering range. The fabrication tolerance of the compound period grating structure is studied in consideration of cost efficiency and the result show that the structure retains good performance even if all the gaps under 100 nm cannot be fabricated. Thus, the compound period grating structure has great potential for many applications such as telecommunication and sensing, especially for solid-state Lidar technology.

In accordance with the continued teachings of the present invention, the OPA is based on the mechanism of interference. If the phase is uniformly distributed in all the array elements, then a beam can be formed upwards by constructive interference, as shown as the radiation beam in FIG. 16. However, in single layer devices, the substrate is also a uniform material, so the OPA will forms another beam downward, shown as the leakage beam in FIG. 16. Unfortunately, this part of light will eventually be wasted. Based on simulation results, in the case of Si waveguide on $SiO_2$ substrate, the efficiency loss caused by the leakage beam can be as high as 60%, therefore resulting in an efficiency of less than 40%.

To overcome this problem, the OPA can be arranged such that it is facing only one direction of uniform material. According to the present teachings, a structure of end-fire OPA is provided to achieve this. In this structure, the OPA is formed on the side of the device. In this case, the direction the OPA faces is air, the emitting beam can be formed as usual; while the backward direction of the OPA is a series of waveguides, the medium is nonuniform, so the leakage beam is suppressed.

A multilayer structure is applied to realize this configuration. High index material is distributed evenly to form the periodic phase element (see FIG. 17). The simulation window of the structure is as shown. The multi layer structure is formed by periodic $Si_3N_4/SiO_2$ stacks. The light will propagates in the $Si_3N_4$ layers (we have 6 layers in the simulation as an example), and form a 1-D periodic phase array at the end, and thus will form a fan beam converged in vertical direction (see FIG. 18).

To converge the beam in the horizontal direction, a delay line configuration is utilized (see FIG. 19). This configuration is first simulated with only one layer waveguide. The emitting beam will converge horizontally. By adding etching all the $Si_3N_4$ layers to be the same delay line structure, a 2-D OPA can be formed on the side (see FIGS. 20 and 21).

Thus recall that in this structure, the 2-D OPA is formed on the side wall of the device. The OPA faces the air, and will generate a 2-D converged beam, and its backward direction is a series of waveguide, the medium is nonuniform, so the backward emitting is highly suppressed. Based on the simulation result, the emitting efficiency of the whole device can reach ~70% in the whole wavelength range from 1500 nm to 1600 nm. Compare to the single layer OPA, which emits beam upwards, the efficiency can be increased by 75% (assuming the efficiency for the single layer OPA is 40%).

The beam steering of this device can be realized by combining wavelength tuning and thermal tuning.

1. The delay line structure is applied on all the $Si_3N_4$ layers, it is sensitive to wavelength tuning. So the wavelength tuning will steer the beam in the horizontal direction. In addition, unlike the waveguide grating coupler device, the delay length of this structure can be freely selected, we actually can select a degree/wavelength sensitivity. As an example, we select the delay length to be 2.7 um in this simulation, and obtain a steering sensitivity of 0.3 degree/1 nm. The form shows the data for this simulation in horizontal (x) direction.

2. The vertical converging of the beam is achieved by the periodic distributed multi layer, which is not sensitive to wavelength tuning. Indeed, the angle in y changes only 0.034 degree in the whole 100 nm wavelength range. So we can use a thermal tuning to steer the beam vertically. By fabricating a metallic heater on the surface, we can heat the device from the top. In this case, a temperature gradient will be generated in vertical direction, and thus to steer the beam vertically.

The number of layers in this structure is limited by how large the light source can cover. So, it can be difficult to obtain a really low FWHM in vertical (y) direction. One possible solution is by using a quasi-periodic layer structure in the vertical direction. As shown in FIG. 22, A=$Si_3N_4$, B=$SiO_2$. Even using same number of the $Si_3N_4$ layers (6 layers in this simulation), the quasi-periodic structure can generate a lower FWHM than the common periodic structure (see FIG. 23). Meanwhile, the wavelength sensitivity is kept the same.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A beam steering device comprising:
a structure having a plurality of layers, the plurality of layers having first-material and second-material layers configured to form a 3D OPA to emit light from an edge of the structure and outputting a 2D converged outcoupling beam from the structure, the structure having an omega-shaped delay line,
wherein the plurality of layers of the structure comprises a quasi-periodic configuration.

2. The beam steering device according to claim 1 wherein each of the first-material layers has a thickness of 800 nm and each of the second-material layers has a thickness of 500 nm sandwiched by the first-material layers.

3. The beam steering device according to claim 2 wherein a spacing between adjacent layers of the plurality of layers is about 2 μm.

4. The beam steering device according to claim 1 wherein each of the first-material layers has a thickness of about 800 nm or less.

5. The beam steering device according to claim 1 wherein each of the second-material layers has a thickness of 500 nm or less disposed between the first-material layers.

6. The beam steering device according to claim 1 wherein the structure comprises a butt-couple at an input end.

7. The beam steering device according to claim 1 wherein the first-material is $Si_3N_4$ and the second-material is SiO2.

8. The beam steering device according to claim 1 wherein the first-material is Si and the second-material is SiO2.

9. The beam steering device according to claim 1 wherein the first-material is Si and the second-material is Si3N4.

* * * * *

UNITED STATES PATENT AND TRADEMARK OFFICE
CERTIFICATE OF CORRECTION

| | | |
|---|---|---|
| PATENT NO. | : 12,061,407 B2 | Page 1 of 1 |
| APPLICATION NO. | : 17/189472 | |
| DATED | : August 13, 2024 | |
| INVENTOR(S) | : Ya Sha Yi et al. | |

It is certified that error appears in the above-identified patent and that said Letters Patent is hereby corrected as shown below:

In the Claims

At Column 20, Claim number 7, Line number 26, delete "SiO2." and insert -- $SiO_2$. --;

At Column 20, Claim number 8, Line number 28, delete "SiO2." and insert -- $SiO_2$. --; and At Column 20, Claim number 9, Line number 30, delete "Si3N4." and insert -- $Si_3N_4$. --.

Signed and Sealed this
Eleventh Day of February, 2025

Coke Morgan Stewart
*Acting Director of the United States Patent and Trademark Office*